United States Patent
Bowles et al.

(10) Patent No.: US 10,572,946 B2
(45) Date of Patent: Feb. 25, 2020

(54) METHODS AND SYSTEMS FOR FACILITATING PROCESSES ASSOCIATED WITH INSURANCE SERVICES AND/OR OTHER SERVICES FOR ELECTRONIC DEVICES

(71) Applicant: ecoATM, LLC, San Diego, CA (US)

(72) Inventors: Mark Vincent Bowles, San Diego, CA (US); Eric Rosser, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 1034 days.

(21) Appl. No.: 14/925,375

(22) Filed: Oct. 28, 2015

(65) Prior Publication Data

US 2016/0125548 A1    May 5, 2016

Related U.S. Application Data

(60) Provisional application No. 62/073,847, filed on Oct. 31, 2014.

(51) Int. Cl.
*G06Q 40/00* (2012.01)
*G06Q 40/08* (2012.01)
(Continued)

(52) U.S. Cl.
CPC .............. *G06Q 40/08* (2013.01); *G06Q 10/30* (2013.01); *G06Q 30/0237* (2013.01); *G06Q 30/0278* (2013.01); *Y02W 90/20* (2015.05)

(58) Field of Classification Search
CPC ........ G06Q 40/00; G06Q 40/08; G06Q 10/30; G06Q 30/0237; G06Q 30/0278
See application file for complete search history.

(56) References Cited

U.S. PATENT DOCUMENTS

| 3,808,439 A | 4/1974 | Renius |
| 4,248,334 A | 2/1981 | Hanley et al. |

(Continued)

FOREIGN PATENT DOCUMENTS

| CN | 1365479 A1 | 8/2002 |
| CN | 2708415 A1 | 7/2005 |

(Continued)

OTHER PUBLICATIONS

Trading devices for dollars, The Economist (US)405.8813: 8(US). Economist Intelligence Unit N.A. Incorporated. (Dec. 1, 2012).*

(Continued)

*Primary Examiner* — Lalita M Hamilton
(74) *Attorney, Agent, or Firm* — Perkins Coie LLP

(57) ABSTRACT

Systems and associated methods for processing insurance claims and performing other processes associated with mobile phones and other electronic devices are described herein. In various embodiments, the present technology includes systems and methods for identifying and evaluating an electronic device to facilitate processing insurance claims for the device. In some embodiments, the present technology includes a self-serve kiosk configured to identify a device, evaluate a device, and facilitate processing insurance claims. In some embodiments, a self-serve kiosk is provided that can identify and evaluate a device, and present one or more insurance offers to a user. Various other aspects of the present technology are described herein.

20 Claims, 7 Drawing Sheets

(51) Int. Cl.
  *G06Q 10/00* (2012.01)
  *G06Q 30/02* (2012.01)

(56) References Cited

U.S. PATENT DOCUMENTS

| | | |
|---|---|---|
| 4,519,522 A | 5/1985 | McElwee |
| 4,715,709 A | 12/1987 | Sekine et al. |
| 4,821,118 A | 4/1989 | Lafreniere |
| 4,870,357 A | 9/1989 | Young et al. |
| 4,878,736 A | 11/1989 | Hekker et al. |
| 4,927,051 A | 5/1990 | Falk et al. |
| 4,951,308 A | 8/1990 | Bishop et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,419,438 A | 5/1995 | Squyres et al. |
| 5,436,554 A | 7/1995 | Decker |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,775,806 A | 7/1998 | Allred |
| 5,839,058 A | 11/1998 | Phillips et al. |
| 5,920,338 A | 7/1999 | Katz |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,181,805 B1 | 1/2001 | Koike et al. |
| 6,228,008 B1 | 5/2001 | Pollington et al. |
| 6,259,827 B1 | 7/2001 | Nichani |
| 6,264,104 B1 | 7/2001 | Jenkins et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,633,377 B1 | 10/2003 | Weiss et al. |
| 6,667,800 B1 | 12/2003 | Larsson et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 7,069,236 B1 | 6/2006 | Tsunenari |
| 7,076,449 B2 | 7/2006 | Tsunenari et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,520,666 B2 | 4/2009 | Pevzner et al. |
| 7,567,344 B2 | 7/2009 | LeBlanc et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,881,965 B2 | 2/2011 | Bowles et al. |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,195,511 B2 | 6/2012 | Bowles et al. |
| 8,200,533 B2 | 6/2012 | Librizzi et al. |
| 8,254,883 B2 | 8/2012 | Uchida |
| 8,266,008 B1 | 9/2012 | Siegel et al. |
| 8,423,404 B2 | 4/2013 | Bowles et al. |
| 8,429,021 B2 | 4/2013 | Kraft et al. |
| 8,463,646 B2 | 6/2013 | Bowles et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,743,215 B1 | 6/2014 | Lee |
| 8,824,136 B1 | 9/2014 | Interian et al. |
| 9,010,627 B1 * | 4/2015 | Prasad ................ G06Q 40/02 |
| | | 235/379 |
| 9,043,026 B2 | 5/2015 | Lien et al. |
| 9,195,979 B2 | 11/2015 | Geller |
| 9,317,989 B2 | 4/2016 | Grow et al. |
| 9,582,101 B2 | 2/2017 | Chang et al. |
| 9,595,238 B2 | 3/2017 | Won |
| 9,818,160 B2 | 11/2017 | Bowles et al. |
| 9,881,284 B2 * | 1/2018 | Bowles ................ G06Q 10/30 |
| 9,911,102 B2 | 3/2018 | Bowles |
| 10,032,140 B2 * | 7/2018 | Bowles ................ G06Q 10/30 |
| 10,055,798 B2 | 8/2018 | Bowles et al. |
| 10,127,647 B2 | 11/2018 | Forutanpour et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0129170 A1 | 9/2002 | Moore et al. |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0036866 A1 | 2/2003 | Nair et al. |
| 2003/0061150 A1 | 3/2003 | Kocher |
| 2003/0146898 A1 | 8/2003 | Kawasaki et al. |
| 2003/0170529 A1 | 9/2003 | Sagawa |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Berger et al. |
| 2004/0186744 A1 | 9/2004 | Lux |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0262521 A1 | 12/2004 | Devitt et al. |
| 2005/0027622 A1 | 2/2005 | Walker et al. |
| 2005/0128551 A1 | 6/2005 | Yang |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0047573 A1 | 3/2006 | Mitchell et al. |
| 2006/0074756 A1 | 4/2006 | Boykin |
| 2006/0167580 A1 | 7/2006 | Whittier |
| 2006/0184379 A1 | 8/2006 | Tan et al. |
| 2006/0195384 A1 | 8/2006 | Bauer et al. |
| 2006/0217152 A1 | 9/2006 | Fok et al. |
| 2006/0229108 A1 | 10/2006 | Cehelnik |
| 2006/0235747 A1 | 10/2006 | Hammond et al. |
| 2006/0261931 A1 | 11/2006 | Cheng |
| 2006/0271431 A1 | 11/2006 | Wehr et al. |
| 2006/0279307 A1 | 12/2006 | Wang et al. |

(56) References Cited

U.S. PATENT DOCUMENTS

| | | |
|---|---|---|
| 2006/0280356 A1 | 12/2006 | Yamagishi |
| 2007/0013124 A1 | 1/2007 | Graef et al. |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0140310 A1 | 6/2007 | Rolton et al. |
| 2007/0150403 A1 | 6/2007 | Mock et al. |
| 2007/0205751 A1 | 9/2007 | Suzuki et al. |
| 2007/0263099 A1 | 11/2007 | Motta et al. |
| 2007/0269099 A1 | 11/2007 | Nishino et al. |
| 2007/0281734 A1 | 12/2007 | Mizrachi |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0097770 A1 | 4/2008 | Low et al. |
| 2008/0109746 A1 | 5/2008 | Mayer |
| 2008/0111989 A1 | 5/2008 | Dufour et al. |
| 2008/0149720 A1 | 6/2008 | Colville |
| 2008/0177598 A1 | 7/2008 | Davie |
| 2008/0207198 A1 | 8/2008 | Juric |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0078775 A1 | 3/2009 | Giebel et al. |
| 2009/0079388 A1 | 3/2009 | Reddy |
| 2009/0095047 A1 | 4/2009 | Patel et al. |
| 2009/0160668 A1 | 6/2009 | Crowley et al. |
| 2009/0184865 A1 | 7/2009 | Valo et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2010/0005004 A1 | 1/2010 | Hudak et al. |
| 2010/0063894 A1 | 3/2010 | Lundy |
| 2010/0088192 A1 | 4/2010 | Bowles et al. |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0169231 A1 | 7/2010 | Bowles et al. |
| 2010/0219234 A1 | 9/2010 | Forbes |
| 2010/0228676 A1 | 9/2010 | Librizzi et al. |
| 2010/0235198 A1 | 9/2010 | Fini et al. |
| 2010/0237854 A1 | 9/2010 | Kumhyr et al. |
| 2010/0262481 A1 | 10/2010 | Baker et al. |
| 2011/0035322 A1 | 2/2011 | Lively |
| 2011/0043628 A1 | 2/2011 | Yun |
| 2011/0060641 A1 | 3/2011 | Grossman et al. |
| 2011/0067520 A1 | 3/2011 | Ihrke et al. |
| 2011/0235853 A1 | 9/2011 | Bowles et al. |
| 2011/0313840 A1 | 12/2011 | Mason et al. |
| 2012/0016518 A1 | 1/2012 | Saario et al. |
| 2012/0029985 A1 | 2/2012 | Wilson et al. |
| 2012/0030097 A1 | 2/2012 | Hagan et al. |
| 2012/0054113 A1 | 3/2012 | Jayaraman et al. |
| 2012/0063501 A1 | 3/2012 | Aguren |
| 2012/0078413 A1 | 3/2012 | Baker, Jr. |
| 2012/0116928 A1 | 5/2012 | Gventer et al. |
| 2012/0116929 A1 | 5/2012 | Gventer et al. |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0191562 A1 | 7/2012 | Bowles et al. |
| 2012/0235812 A1 | 9/2012 | De Mello et al. |
| 2012/0254046 A1 | 10/2012 | Librizzi et al. |
| 2012/0303431 A1 | 11/2012 | Phillips et al. |
| 2013/0006713 A1 | 1/2013 | Haake et al. |
| 2013/0034305 A1 | 2/2013 | Jahanshahi et al. |
| 2013/0046611 A1 | 2/2013 | Bowles et al. |
| 2013/0046699 A1 | 2/2013 | Bowles et al. |
| 2013/0124426 A1 | 5/2013 | Bowles et al. |
| 2013/0126741 A1 | 5/2013 | Srivastava et al. |
| 2013/0144797 A1 | 6/2013 | Bowles et al. |
| 2013/0155061 A1 | 6/2013 | Jahanshahi et al. |
| 2013/0173434 A1 | 7/2013 | Hartman |
| 2013/0181935 A1 | 7/2013 | McKenzie et al. |
| 2013/0191236 A1 | 7/2013 | Bowles |
| 2013/0198089 A1 | 8/2013 | Bowles |
| 2013/0198144 A1 | 8/2013 | Bowles |
| 2013/0226679 A1 | 8/2013 | Bowles |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0275314 A1 | 10/2013 | Bowles |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0012643 A1 | 1/2014 | Behrisch |
| 2014/0038556 A1 | 2/2014 | De Sousa |
| 2014/0052329 A1 | 2/2014 | Amirpour |
| 2014/0067710 A1 | 3/2014 | Gventer et al. |
| 2014/0143161 A1 | 5/2014 | Ahn |
| 2014/0150100 A1 | 5/2014 | Gupta et al. |
| 2014/0156883 A1 | 6/2014 | Bowles |
| 2014/0214505 A1 | 7/2014 | Shuster-Arechiga et al. |
| 2014/0235258 A1 | 8/2014 | Chen et al. |
| 2014/0244315 A1 | 8/2014 | Cahill et al. |
| 2014/0347473 A1 | 11/2014 | Wolff et al. |
| 2015/0006281 A1 | 1/2015 | Takahashi |
| 2015/0066677 A1 | 3/2015 | Bowles et al. |
| 2015/0088731 A1 | 3/2015 | Ackerman |
| 2015/0120485 A1 | 4/2015 | Nash |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0332206 A1 | 11/2015 | Trew et al. |
| 2015/0356637 A1 | 12/2015 | Graffia et al. |
| 2016/0019685 A1 | 1/2016 | Nguyen |
| 2016/0055392 A1 | 2/2016 | Nakano |
| 2016/0091549 A1 | 3/2016 | Snook et al. |
| 2016/0092849 A1 | 3/2016 | Cirannek et al. |
| 2016/0098688 A1 | 4/2016 | Hunt et al. |
| 2016/0098689 A1 | 4/2016 | Bowles et al. |
| 2016/0098690 A1 | 4/2016 | Silva et al. |
| 2016/0125367 A1 | 5/2016 | Bowles et al. |
| 2016/0125612 A1 | 5/2016 | Seki et al. |
| 2016/0132840 A1 | 5/2016 | Bowles et al. |
| 2016/0171456 A1 | 6/2016 | Bowles |
| 2016/0171544 A1 | 6/2016 | Heminger et al. |
| 2016/0171575 A1 | 6/2016 | Bowles et al. |
| 2016/0210648 A1 | 7/2016 | Cirannek |
| 2016/0269401 A1 | 9/2016 | Saito et al. |
| 2016/0275460 A1 | 9/2016 | Ploetner et al. |
| 2016/0275518 A1 | 9/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0169401 A1 | 6/2017 | Beane et al. |
| 2017/0278191 A1 | 9/2017 | Tassone et al. |

FOREIGN PATENT DOCUMENTS

| | | |
|---|---|---|
| CN | 1864088 A1 | 11/2006 |
| CN | 1957320 A1 | 5/2007 |
| CN | 200965706 A1 | 10/2007 |
| CN | 102246384 A1 | 11/2011 |
| CN | 202351953 A1 | 7/2012 |
| CN | 202394296 A1 | 8/2012 |
| CN | 102654927 A1 | 9/2012 |
| CN | 102812500 A1 | 12/2012 |
| CN | 102930642 A1 | 2/2013 |
| CN | 102976004 A1 | 3/2013 |

(56) References Cited

FOREIGN PATENT DOCUMENTS

| | | |
|---|---|---|
| CN | 103198562 A1 | 7/2013 |
| CN | 103226870 A1 | 7/2013 |
| CN | 203242065 A1 | 10/2013 |
| CN | 103440607 A1 | 12/2013 |
| CN | 103544772 A1 | 1/2014 |
| CN | 203408902 A1 | 1/2014 |
| CN | 103662541 A1 | 3/2014 |
| CN | 103679147 A1 | 3/2014 |
| CN | 203520502 A1 | 4/2014 |
| CN | 203588366 A1 | 5/2014 |
| CN | 103954626 | 7/2014 |
| CN | 105513201 A1 | 4/2016 |
| EP | 1168253 A1 | 1/2002 |
| EP | 1703436 A1 | 9/2006 |
| GB | 2167553 | 5/1986 |
| JP | 7112801 A1 | 5/1995 |
| JP | 7334583 A1 | 12/1995 |
| JP | 2000121564 A2 | 4/2000 |
| JP | 3123095 | 1/2001 |
| JP | 2002019147 A1 | 1/2002 |
| JP | 2002183286 A1 | 6/2002 |
| JP | 2002259528 A1 | 9/2002 |
| JP | 2002302252 A1 | 10/2002 |
| JP | 2002324264 A1 | 11/2002 |
| JP | 2002358354 A1 | 12/2002 |
| JP | 2003139516 A1 | 5/2003 |
| JP | 2003242243 A1 | 8/2003 |
| JP | 2003264007 A1 | 9/2003 |
| JP | 2003267509 A1 | 9/2003 |
| JP | 2004021569 A1 | 1/2004 |
| JP | 2004288143 A1 | 10/2004 |
| JP | 2004303102 A1 | 10/2004 |
| JP | 2004341681 A1 | 12/2004 |
| JP | 2006127308 A1 | 5/2006 |
| JP | 2006195814 A1 | 7/2006 |
| JP | 2006227764 A1 | 8/2006 |
| JP | 2006260246 A1 | 9/2006 |
| JP | 2007141266 A1 | 6/2007 |
| JP | 2007179516 A1 | 7/2007 |
| JP | 2007265340 A1 | 10/2007 |
| JP | 2008522299 A1 | 6/2008 |
| JP | 2008293391 A1 | 12/2008 |
| JP | 2007086725 A1 | 4/2009 |
| JP | 2009245058 A1 | 10/2009 |
| JP | 2009250971 A1 | 10/2009 |
| JP | 2010177720 A1 | 8/2010 |
| JP | 2012058932 A1 | 3/2012 |
| JP | 2013033361 A1 | 2/2013 |
| JP | 2013037441 A1 | 2/2013 |
| JP | 2013551823 A1 | 8/2013 |
| KR | 20000064168 A1 | 11/2000 |
| KR | 20130085255 A1 | 7/2013 |
| KR | 20140037543 A1 | 3/2014 |
| WO | 115096 A1 | 3/2001 |
| WO | 205176 A1 | 1/2002 |
| WO | WO-225613 | 3/2002 |
| WO | 239357 A1 | 5/2002 |
| WO | 3012717 A1 | 2/2003 |
| WO | 3014994 A1 | 2/2003 |
| WO | 2004021114 A1 | 3/2004 |
| WO | 2004114490 A1 | 12/2004 |
| WO | 2005008566 A1 | 1/2005 |
| WO | 2005101346 A1 | 10/2005 |
| WO | 2006058601 A1 | 6/2006 |
| WO | 2006080851 A1 | 8/2006 |
| WO | WO-2007066166 | 6/2007 |
| WO | 9128176 A1 | 10/2009 |
| WO | 2009128173 A1 | 10/2009 |
| WO | 2009129526 A1 | 10/2009 |
| WO | 2010040116 A1 | 4/2010 |
| WO | 2010128267 A1 | 11/2010 |
| WO | 2010128315 A1 | 11/2010 |
| WO | 2011131016 A1 | 10/2011 |
| WO | 2012138679 A1 | 10/2012 |
| WO | 2013074819 A1 | 5/2013 |
| WO | WO-2013/063042 A1 | 5/2013 |
| WO | WO-2014075055 | 5/2014 |
| WO | 2015022409 A1 | 2/2015 |

OTHER PUBLICATIONS

Kanter, James Max, "Color Crack:Identifying Cracks in Glass," dated Dec. 9, 2014; retrieved from the internet http://www.jmaxkanter.com/static/papers/color_crack.pdf on Sep. 22, 2017.

Oliveira, et al., "Automatic crack detection on road imagery using anisotropic diffusion and region linkage," 18th European Signal Processing Conference (EUSIPCO-2010), Aug. 23, 2010, pp. 274-278.

Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.

2006 Florida Statutes Title XXXIII, Chapter 538, Sections 538.03 and 538.04, 7 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Bussiness Wire, "The World's First Office Photography Machine" at CES 2008 Launched by Ortery Technologies, Jan. 7, 2008, 3 pages.

CNET, "Tackiing LCD "burn ins", and dead/stick Pixels", published Sep. 2, 2009, retrieved from http://www.cnet.com/news/tackling-lcd-burn-ins-and-deadstuck-pixels/.

Evgenii Masunov, Mar. 25, 2010, http://www.appleinsider.ru/news/ipone-obladaet-luchshim-tachskrinom-provereno_robotom.html, 4 pages.

Geekanoids, You Tube Video, "Apple iPhone 3GS Unboxing and Review", uploaded on Jun. 19, 2009 retrieved from http://www.youtube.com/watch?v=GCEi9QAeDqk on Sep. 2, 2009.

GSM Arena Glossary, "LCD (Liquid Crystal Display", retrieved from http://www.gsmarena.com/glossary.php3?term=lcd on Apr. 28, 2016, 1 page.

International Search Report and Written Opinion dated Jan. 5, 2016 in International Application No. PCT/US2015/057810, 10 pages.

Lambert, Emily, "Use It Up, Wear It Out", Forbes 175.5 (2005): 77-78. Business Source Complete. Web. Jan. 6, 2015, 3 pages.

Littleton Partners with Donations Ink (Jan. 19, 2006) US Fed News Service, Including US State News. Web. Jan. 6, 2015, 1 page.

MobileGazette.com, "2006 in Review: The Good, The Bad and The Ugly", published Dec. 2006, retrieved from http://www.mobilegazette.com/2006-review-06x12x22.htm on Nov. 11, 2015.

PC World, "Wipe Your Cell Phone's Memory Before Giving it Away", published Jan. 2006. retrieved from http://www.washingtonpost.com/wp-dyn/content/article/2006/01/30/AR2006013001144.html on Nov. 10, 2015.

Perng et al., "A Novel Vision System for CRT Panel Auto-Inspection", Proceedings of the 2005 IEEE International Conference on Mechatronics, Jul. 10-12, 2005, pp. 4.

Perng et al., "A Novel Vision System for CRT PaNnel Auto-Inspection", Journal of the Chinese Institute of Industrial Engineers, vol. 24, No. 5, pp. 341-350 (2007).

Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.

Rehg et al. "Vision for a Smart Kiosk" IEEE, Computer Society Conference on Computer Vision and Pattern Recognition (1997).

Rolf Steinhilper "Remanufacturing: The Ultimate Form of Recycling", Fraunhofer IRBVerlag, 1998, parts 1-3, http://www.reman.org/Publications_main.htm.

SimplySellular, "Get Cash for your Old Cell Phone", published Apr. 2, 2010, retrieved from http://simplysellular.com/conditions.php on Jan. 6, 2015, 2 pages.

Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.

(56) References Cited

OTHER PUBLICATIONS

Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.

Dennis Bournique: "Mobile Karma Shuts Down As iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Tecace Software: "Your phone appraisal—Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>, accessed Nov. 27, 2017; 2 pages.

Co-Pending U.S. Appl. No. 15/855,320 of Forutanpour et al., filed Dec. 27, 2017.

Co-Pending U.S. Appl. No. 15/130,851 of Forutanpour, B. et al., filed Apr. 15, 2016.

Co-Pending U.S. Appl. No. 15/195,828 of Forutanpour, B. et al., filed Jun. 28, 2016.

Co-Pending U.S. Appl. No. 15/630,508 of Silva, J. et al., filed Jun. 22, 2017.

Co-Pending U.S. Appl. No. 15/630,539 of Bowles, M. et al., filed Jun. 22, 2017.

Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].

Graffia et al., "Retail Station for E-Device Identification, Assessment, and Trade-In", Jun. 6, 2014 (Drawings and Specification) (Year: 2014).

Turner, "5 MP3 Players for Pumping Up Your Workouts," Mashable.com, Nov. 4, 2010, available online at https://mashable.com/2010/11/04/mp3-players-for-sports/ (Year: 2010).

* cited by examiner

METHODS AND SYSTEMS FOR FACILITATING PROCESSES ASSOCIATED WITH INSURANCE SERVICES AND/OR OTHER SERVICES FOR ELECTRONIC DEVICES

TECHNICAL FIELD

The present disclosure is directed generally to methods and systems for facilitating the offer, sale, and/or other processes associated with products and services for mobile phones and other consumer electronic devices.

BACKGROUND

Consumer electronic devices, such as mobile phones, laptop computers, notebooks, tablets, MP3 players, etc., are ubiquitous. Currently there are over 6 billion mobile devices in use in the world; and the number of these devices is growing rapidly with more than 1.8 billion mobile phones being sold in 2013 alone. By 2017 it is expected that there will be more mobile devices in use than there are people on the planet. In addition to mobile phones, over 300 million desk-based and notebook computers shipped in 2013, and for the first time the number of tablet computers shipped exceeded laptops. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentially harmful consequences for humans and the environment.

As an alternative to retailer trade-in or buyback programs, consumers can now recycle and/or sell their used mobile phones using self-service kiosks located in malls or other publicly accessible areas. Such kiosks are operated by ecoATM, Inc., the assignee of the present application, and are disclosed in, for example, U.S. Pat. Nos. 8,463,646, 8,423,404, 8,239,262, 8,200,533, 8,195,511, and 7,881,965, which are commonly owned by ecoATM, Inc. and are incorporated herein by reference in their entireties.

Various products and services, such as warranties and insurance are often available for electronic devices such as mobile phones. Throughout this disclosure, the term "insurance" will be used to refer broadly to insurance as well as warranties, whether offered by retailers, manufacturers, after-market insurers, or others. There continues to be a need for improving the means available for offering insurance products and processing insurance claims for mobile phones and other electronic devices. Simplifying the claim process, enhancing the consumer experience, and discouraging fraud can reduce insurance issues.

DETAILED DESCRIPTION

Figure 1:
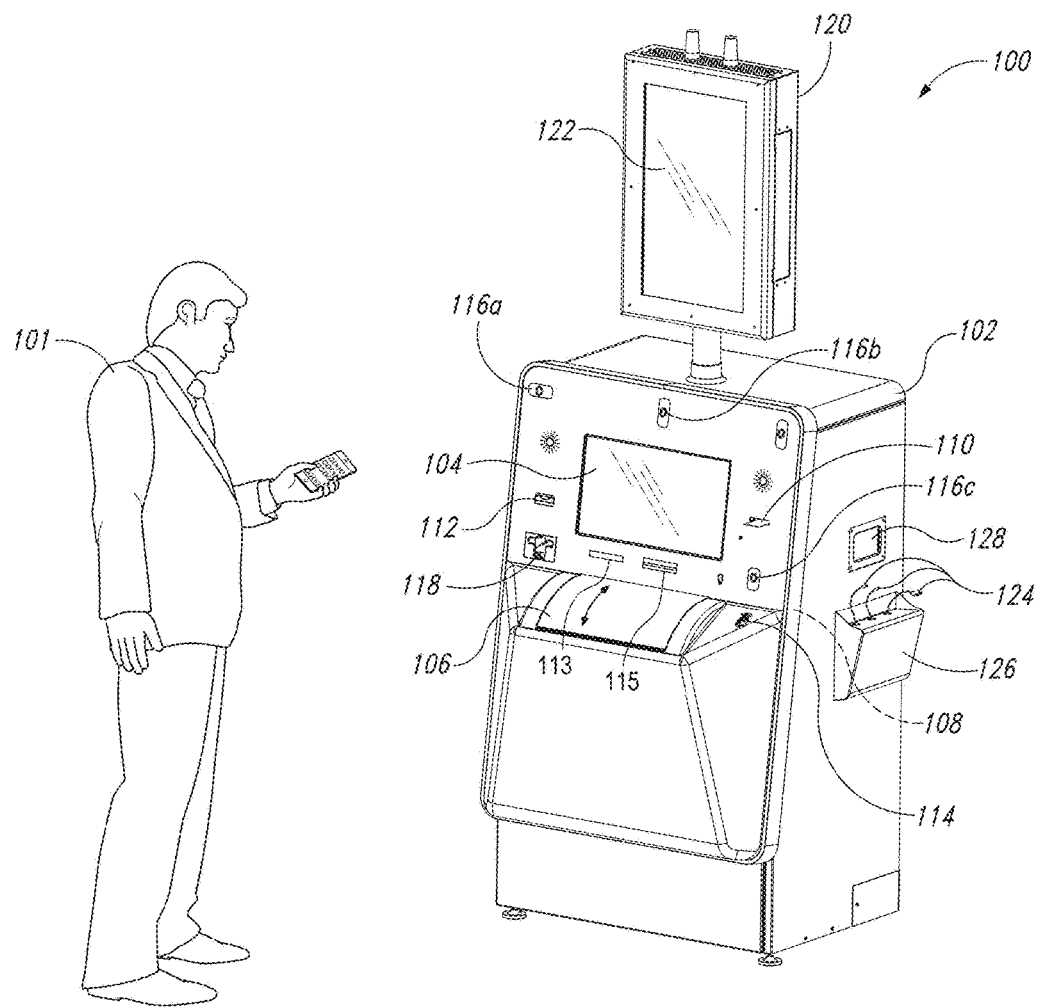
FIG. 1 is an isometric view of a machine configured in accordance with an embodiment of the present technology for recycling electronic devices.

The following disclosure describes various embodiments of systems and methods for automated processing of insurance claims for electronic devices and for performing other related processes. For example, the following describes various embodiments of methods of processing insurance claims for electronic devices via an automated kiosk. A user can submit the insured electronic device for automated identification, inspection, and evaluation by the kiosk. The kiosk can communicate with the insurance carrier to confirm the applicable insurance coverage and to confirm the identity of the insured and, based on the determined condition of the electronic device, may determine a deductible and issue the remaining balance to the user. The kiosk may then retain the insured electronic device to return to the insurance carrier, or to be recycled. In some embodiments, a replacement electronic device can be sent to the user rather than a monetary payment.

In conventional practice, when a user damages her mobile phone, for example, and the phone is covered by insurance, she can file a claim on her broken phone and oftentimes will receive a replacement phone by mail. To file a claim, the user is instructed by the insurance carrier to grade the condition of the damaged phone and return the phone to them. Often, the user does not accurately grade the phone condition, or else fails to mail in the damaged phone altogether. If the user makes a mistake in grading the phone, or else is incorrect in providing the phone's make, model, and/or other information, this can impose significant costs on the phone insurer.

Processing insurance claims with the automated kiosk addresses a number of problems. First, in some embodiments the kiosk can positively identify each electronic device by its unique serial number, IMEI number, IMED number, or other u unique number, which can help limit a common fraud in which a consumer insures one device but then submits a claim on a different device. Second, the kiosk can positively identify the user to ensure that the user is the holder of the associated insurance policy. Third, since the kiosk accepts the insured electronic device before issuing payment to the user, there is no risk of the insurer failing to return the insured electronic device. Fourth, the kiosk can automatically assess the make, model, features, and condition of the electronic device, thereby reducing the risk that the user will provide an inaccurate description of the damaged electronic device. Additionally, in some embodiments the kiosk can automatically and accurately set the deducible price that the user has to pay.

Also described below are various embodiments of methods of selling insurance coverage and/or other products for electronic devices via an automated kiosk. For example, in some embodiments a user can submit an electronic device for automated identification, inspection, and evaluation by the kiosk. Based on the determined condition of the electronic device, the system can offer the user one or more options for insurance coverage, for example having different premiums, deductibles, and/or coverages. The user can submit payment via the kiosk. Selling insurance coverage for electronic devices with the automated kiosk results in more efficient processing, and also allows for confirmation of the current condition of the electronic device prior to issuing coverage. As a result, users can obtain insurance coverage for electronic devices even well beyond the initial date of purchase, while risk to the insurer is reduced by the automated evaluation of the electronic device.

Certain details are set forth in the following description and in FIGS. 1-6 to provide a thorough understanding of various embodiments of the present technology. In other instances, well-known structures, materials, operations and/or systems often associated with smartphones and other handheld devices, consumer electronic devices, insurance and similar products, computer hardware, software, and network systems, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below should be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as the position of components and certain precise connections between such components when such details are unnecessary for a complete understanding of how to make and use the invention.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a kiosk 100 for recycling and/or other processing of mobile phones and other consumer electronic devices in accordance with the present technology. The term "processing" is used herein for ease of reference to generally refer to all manner of services and operations that may be performed or facilitated by the kiosk 100 on, with, or otherwise in relation to an electronic device. Such services and operations can include, for example, selling, reselling, recycling, donating, exchanging, identifying, evaluating, pricing, auctioning, decommissioning, transferring data from or to, reconfiguring, refurbishing, etc., mobile phones and other electronic devices. Although many embodiments of the present technology are described herein in the context of mobile phones, aspects of the present technology are not limited to mobile phones and generally apply to other consumer electronic devices. Such devices include, as non-limiting examples, all manner of mobile phones, smart phones, handheld devices, PDAs, MP3 players, tablet, notebook and laptop computers, DVRs, e-readers, cameras, etc. In some embodiments, it is contemplated that the kiosk 100 can facilitate selling and/or otherwise processing larger consumer electronic devices, such as desktop computers, TVs, game consoles, etc., as well smaller electronic devices such as Google Glass™, smart-watches (e.g., Apple Watch), other wearable computers, etc. The kiosk 100 and various features thereof can be at least generally similar in structure and function to the kiosks and corresponding features described in U.S. Pat. Nos. 8,463, 646, 8,423,404, 8,239,262, 8,200,533, 8,195,511, and 7,881, 965; and in U.S. patent application Ser. Nos. 12/573,089, 12/727,624, 13/113,497, 12/785,465, 13/017,560, 13/438, 924, 13/753,539, 13/658,825, 13/733,984, 13/705,252, 13/487,299 13/492,835, 13/562,292, 13/658,828, 13/693, 032, 13/792,030, 13/794,814, 13/794,816, 13/862,395 and 13/913,408, each of which is incorporated herein in its entirety by reference. All of the patents and patent applications listed in the preceding sentence are commonly owned by the applicant of the present application, and they along with any other patents or patent applications identified herein are incorporated herein by reference in their entireties.

In the illustrated embodiment, the kiosk 100 is a floor-standing self-service kiosk configured for use by a user 101 (e.g., a consumer, customer, etc.) to recycle, sell, and/or perform other operations with a mobile phone or other consumer electronic device. In other embodiments, the kiosk 100 can be configured for use on a countertop or a similar raised surface. Although the kiosk 100 is configured for use by consumers, in various embodiments the kiosk 100 and/or various portions thereof can also be used by other operators, such as a retail clerk or kiosk assistant to facilitate the selling or other processing of mobile phones and other electronic devices.

In the illustrated embodiment, the kiosk 100 includes a housing 102 that is approximately the size of a conventional vending machine. The housing 102 can be of conventional manufacture from, for example, sheet metal, plastic panels, etc. A plurality of user interface devices are provided on a front portion of the housing 102 for providing instructions and other information to users, and/or for receiving user inputs and other information from users. For example, the kiosk 100 can include a display screen 104 (e.g., a liquid crystal display ("LCD") or light emitting diode ("LED") display screen, a projected display (such as a heads-up display or a head-mounted device), and so on) for providing information, prompts, etc., to users. The display screen 104 can include a touch screen for receiving user input and responses to displayed prompts. In addition or alternatively, the kiosk 100 can include a separate keyboard or keypad for this purpose. The kiosk 100 can also include an ID reader or scanner 112 (e.g., a driver's license scanner), a fingerprint reader 114, and one or more cameras 116 (e.g., digital still and/or video cameras, identified individually as cameras 116a-c). The kiosk 100 can also include payment acceptance devices such as cash accepter 113 and card reader 115. The kiosk 100 can additionally include output devices such as a label printer having an outlet 110, and a cash dispenser having an outlet 118. Although not identified in FIG. 1, the kiosk 100 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices can include a touchpad, pointing device such as a mouse, joystick, pen, game pad, motion sensor, scanner, eye direction monitoring system, etc. Additionally the kiosk 100 can also include a bar code reader, QR code reader, bag/package dispenser, a digital signature pad, etc. In the illustrated embodiment, the kiosk 100 additionally includes a header 120 having a display screen 122 for displaying marketing advertisements and/or other video or graphical information to attract users to the kiosk. In addition to the user interface devices described above, the front portion of the housing 102 also includes an access panel or door 106 located directly beneath the display screen 104. As described in greater detail below, the access door is configured to automatically retract so that the user 101 can place an electronic device (e.g., a mobile phone) in an inspection area 108 for automatic inspection by the kiosk 100.

A sidewall portion of the housing 102 can include a number of conveniences to help users recycle or otherwise process their mobile phones. For example, in the illustrated embodiment the kiosk 100 includes an accessory bin 128 that is configured to receive mobile device accessories that the user wishes to recycle or otherwise dispose of. Additionally, the kiosk 100 can provide a free charging station 126 with a plurality of electrical connectors 124 for charging a wide variety of mobile phones and other consumer electronic devices.

Figure 2B:
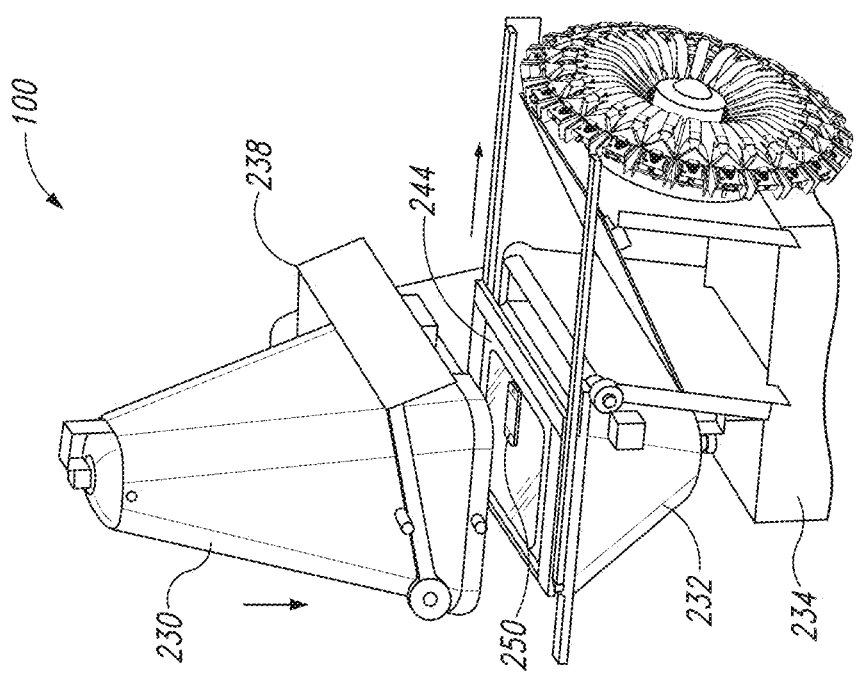
FIGS. 2A-2D are a series of isometric views of the machine of FIG. 1 with a number of exterior panels removed to illustrate operation of the machine in accordance with an embodiment of the present technology.
Figure 2A:
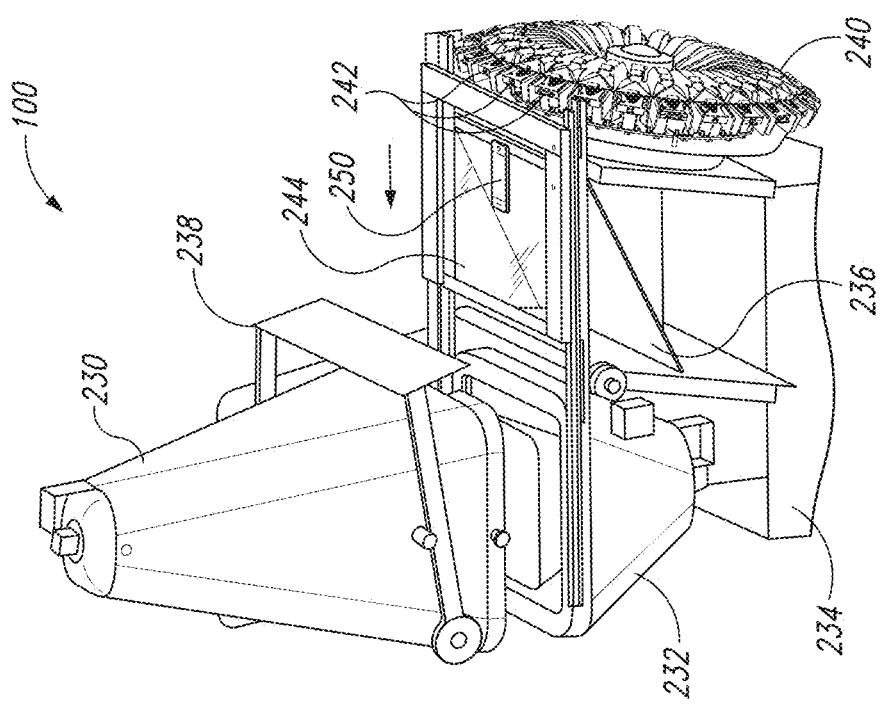

FIGS. 2A-2D are a series of isometric views of the kiosk 100 with the housing 102 removed to illustrate selected internal components configured in accordance with an embodiment of the present technology. Referring first to FIG. 2A, in the illustrated embodiment the kiosk 100 includes a connector carrier 240 and an inspection plate 244 operably disposed behind the access door 106 (FIG. 1). In the illustrated embodiment, the connector carrier 240 is a rotatable carrousel that is configured to rotate about a generally horizontal axis and carries a plurality of electrical connectors 242 (e.g., approximately 25 connectors) distributed around an outer periphery thereof. In other embodiments, other types of connector carrying devices (including both fixed and movable arrangements) can be used. In some embodiments, the connectors 242 can include a plurality of interchangeable USB connectors configured to provide power and/or exchange data with a variety of different mobile phones and/or other electronic devices. In operation, the connector carrier 240 is configured to automatically rotate about its axis to position an appropriate one of the connectors 242 adjacent to an electronic device, such as a mobile phone 250, that has been placed on the inspection plate 244 for recycling. The connector 242 can then be manually and/or automatically withdrawn from the connector carrier 240 and connected to a port on the mobile phone 250 for electrical analysis. Such analysis can include, e.g., an evaluation of the make, model, configuration, condition, etc., using one or more of the methods and/or systems described in detail in the commonly owned patents and patent applications identified herein and incorporated by reference in their entireties.

In the illustrated embodiment, the inspection plate 244 is configured to translate back and forth (on, e.g., parallel mounting tracks) to move an electronic device, such as the mobile phone 250, between a first position directly behind the access door 106 and a second position between an upper chamber 230 and an opposing lower chamber 232. Moreover, in this embodiment the inspection plate 244 is transparent, or at least partially transparent (e.g., formed of glass, Plexiglas, etc.) to enable the mobile phone 250 to be photographed and/or otherwise optically evaluated from all, or at least most viewing angles (e.g., top, bottom, sides, etc.) using, e.g., one or more cameras, mirrors, etc. mounted to or otherwise associated with the upper and lower chambers 230 and 232. When the mobile phone 250 is in the second position, the upper chamber 230 can translate downwardly to generally enclose the mobile phone 250 between the upper chamber 230 and the lower chamber 232. The upper chamber 230 is operably coupled to a gate 238 that moves up and down in unison with the upper chamber 230. As noted above, in the illustrated embodiment the upper chamber 230 and/or the lower chamber 232 can include one or more cameras, magnification tools, scanners (e.g., bar code scanners, infrared scanners, etc.) or other imaging components (not shown) and an arrangement of mirrors (also not shown) to view, photograph and/or otherwise visually evaluate the mobile phone 250 from multiple perspectives. In some embodiments, one or more of the cameras and/or other imaging components discussed above can be movable to facilitate device evaluation. The inspection area 108 can also include weight scales, heat detectors, UV readers/detectors, and the like, for further evaluation of electronic devices placed therein. The kiosk 100 can further include an angled binning plate 236 for directing electronic devices from the transparent plate 244 into a collection bin 234 positioned in a lower portion of the kiosk 100.

Figure 2D:
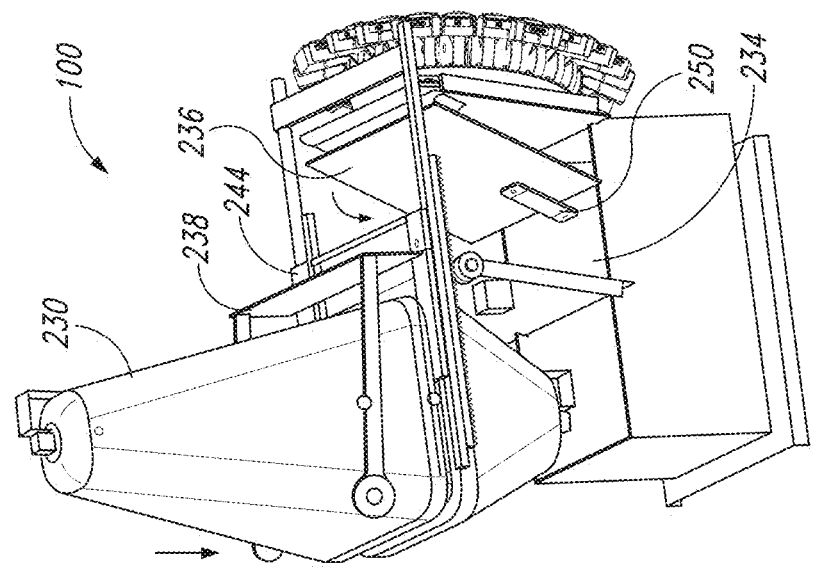

The kiosk 100 can be used in a number of different ways to efficiently facilitate the recycling, selling and/or other processing of mobile phones and other consumer electronic devices. Referring to FIGS. 1-2D together, in one embodiment a user wishing to sell a used mobile phone, such as the mobile phone 250, approaches the kiosk 100 and identifies the type of device the user wishes to sell in response to prompts on the display screen 104. Next, the user may be prompted to remove any cases, stickers, or other accessories from the device so that it can be accurately evaluated. Additionally, the kiosk 100 may print and dispense a unique identification label (e.g., a small adhesive-backed sticker with a quick response code ("QR code"), barcode, or other machine-readable indicia, etc.) from the label outlet 110 for the user to adhere to the back of the mobile phone 250. After this is done, the door 106 retracts and opens allowing the user to place the mobile phone 250 onto the transparent plate 244 in the inspection area 108 (FIG. 2A). The door 106 then closes and the transparent plate 244 moves the mobile phone 250 under the upper chamber 230 as shown in FIG. 2B. The upper chamber 230 then moves downwardly to generally enclose the mobile phone 250 between the upper and lower chambers 230 and 232, and the cameras and/or other imaging components in the upper and lower chambers 230 and 232 perform a visual inspection of the mobile phone 250. In some embodiments, the visual inspection can include a computer-implemented visual analysis (e.g., a three-dimensional ("3D") analysis) performed by a processing device within the kiosk (e.g., a CPU) to confirm the identification of the mobile phone 250 (e.g. make, model and/or sub-model) and/or to evaluate or assess the condition and/or function of the mobile phone 250 and/or its various components and systems. For example, the visual analysis can include computer-implemented evaluation (e.g., a digital comparison) of images of the mobile phone 250 taken from top, side and/or end view perspectives to determine length, width, and/or height (thickness) dimensions of the mobile phone 250. The visual analysis can further include a computer-implemented inspection of a display screen on the mobile phone 250 to check for, e.g., cracks in the glass and/or other damage or defects in the LCD (e.g., defective pixels, etc.). In some embodiments, the kiosk 100 can perform the visual analysis using one or more of the methods and/or systems described in detail in the commonly owned patents and patent applications identified herein and incorporated by reference in their entireties.

Figure 2C:
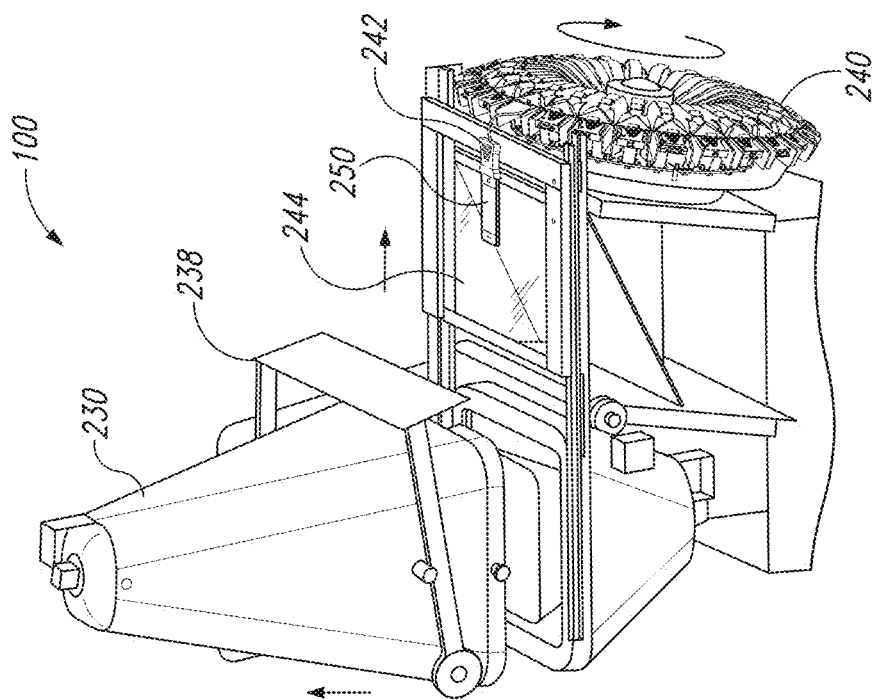

Referring next to FIG. 2C, after the visual analysis is performed and the device has been identified, the upper chamber 230 returns to its upper position and the transparent plate 244 returns the mobile phone 250 to its initial position near the door 106. The display screen 104 can also provide an estimated price, or an estimated range of prices, that the kiosk 100 may offer the user for the mobile phone 250 based on the visual analysis, and/or based on user input (e.g., input regarding the type, condition, etc. of the phone 250). If the user indicates (via, e.g., input via the touch screen) that she wishes to proceed with the transaction, the connector carrier 240 automatically rotates an appropriate one of the connectors 242 into position adjacent the transparent plate 244, and door 106 is again opened. The user can then be instructed (via, e.g., the display screen 104) to withdraw the selected connector 242 (and its associated wire) from the carrousel 240, plug the connector 242 into the corresponding port (e.g., a USB port) on the mobile phone 250, and reposition the mobile phone 250 in the inspection area on the transparent plate 244. After doing so, the door 106 once again closes and the kiosk 100 (e.g. the kiosk CPU) performs an electrical inspection of the device via the connector 242 to further evaluate the condition of the phone as well as specific component and operating parameters such as the memory, carrier, etc. In addition or alternatively, in some embodiments the electrical inspection can include a determination of phone manufacturer information (e.g., a vendor identification number or VID) and product information (e.g., a product identification number or PID), and/or determination of the International Mobile Station Equipment Identity (IMEI) number or Mobile Equipment Identifier (MEID) number associated with the device. In some embodiments, the kiosk 100 can perform the electrical analysis using one or more of the methods and/or systems described in detail in the commonly owned patents and patent applications identified herein and incorporated by reference in their entireties.

After the visual and electronic analysis of the mobile phone 250, the user is presented with a phone purchase price via the display screen 104. If the user declines the price (via, e.g., the touch screen), a retraction mechanism (not shown) automatically disconnects the connector 242 from the mobile phone 250, the door 106 opens, and the user can reach in and retrieve the mobile phone 250. If the user accepts the price, the door 106 remains closed and the user may be prompted to place his or her identification (e.g., a driver's license) in the ID scanner 112 and provide a thumbprint via the fingerprint reader 114. As a fraud prevention measure, the kiosk 100 can be configured to transmit an image of the driver's license to a remote computer screen, and an operator at the remote computer can visually compare the picture (and/or other information) on the driver's license to an image of the person standing in front of the kiosk 100 as viewed by one or more of the cameras 116*a-c* (FIG. 1) to confirm that the person attempting to sell the phone 250 is in fact the person identified by the driver's license. In some embodiments, one or more of the cameras 116*a-c* can be movable to facilitate viewing of kiosk users, as well as other individuals in the proximity of the kiosk 100. Additionally, the person's fingerprint can be checked against records of known fraud perpetrators. If either of these checks indicate that the person selling the phone presents a fraud risk, the transaction can be declined and the mobile phone 250 returned. After the user's identity has been verified, the transparent plate 244 moves back toward the upper and lower chambers 230 and 232. As shown in FIG. 2D, however, when the upper chamber 230 is in the lower position the gate 238 permits the transparent plate 244 to slide underneath but not electronic devices carried thereon. As a result, the gate 238 knocks the mobile phone 150 off of the transparent plate 244, onto the binning plate 236 and into the bin 234. The kiosk can then provide payment of the purchase price to the user. In some embodiments, payment can be made in the form of cash dispensed from the cash outlet 118. In other embodiments, the user can receive remuneration for the mobile phone 150 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet etc.), Bitcoin, etc.

As those of ordinary skill in the art will appreciate, the foregoing routines are but some examples of ways in which the kiosk 100 can be used to recycle or otherwise process consumer electronic devices such as mobile phones. Although the foregoing example is described in the context of mobile phones, it should be understood that the kiosk 100 and various embodiments thereof can also be used in a similar manner for recycling virtually any consumer electronic device, such as MP3 players, tablet computers, PDAs, and other portable devices, as well as other relatively non-portable electronic devices such as desktop computers, printers, devices for implementing games, entertainment or other digital media on CDs, DVDs, Blu-ray, etc. Moreover, although the foregoing example is described in the context of use by a consumer, the kiosk 100 in various embodiments thereof can similarly be used by others, such as a store clerk, to assist consumers in recycling, selling, exchanging, etc. their electronic devices.

Additionally, in other embodiments, the user can attach the electrical connector to the mobile phone 250 and/or perform an electrical analysis of the device before the kiosk 100 performs a visual analysis of the phone. For example, in such an embodiment the user can approach the kiosk 100 and identify the type of device (e.g., the make and model) he or she wishes to recycle, and/or the appropriate electrical connector for connecting to the device. The kiosk 100 can then use this information to stage the appropriate electrical connector at the inspection area. Alternatively, the kiosk 100 can present the user with a selection of standard electrical connectors from which the user can determine an appropriate electrical connector for connecting to the device. Either way, the door 106 retracts and the user is instructed to withdraw the selected connector 242 from the carrier 240, plug it into the corresponding port (e.g., a USB port) on the mobile phone 250, and position the mobile phone 250 on the transparent plate 244 in the inspection area. The user may also be prompted to remove any cases, stickers, or other accessories from the mobile phone 250, and adhere a unique identification label to the back of the mobile phone 250 as described above. The door 106 then closes and the kiosk 100 can perform an electrical inspection of the mobile phone 250 as described above, and after the electrical inspection, a visual inspection as described above. The electrical inspection can include gathering device identification information and/or other information, which the kiosk 100 can then use to customize further interaction with the user, such as to add or omit user inquiries depending on the type of device the user connects. Thus, in some embodiments, electrical inspection of the mobile phone 250 can occur before the user provides information about the mobile phone 250 to the kiosk 100. After the visual and electronic analysis of the mobile phone 250, the user may be presented with a phone purchase price via the display screen 104. If the user declines the price, the phone is returned to the user. If the user accepts the price, the door 106 remains closed and the purchase transaction proceeds as described above.

The Figures described herein and below include representative flow diagrams and other information that depict processes used in some embodiments of the present technology. These flow diagrams may not show all functions or exchanges of data, but instead they provide an understanding of commands and data exchanged under the systems described herein. Those skilled in the relevant art will recognize that some functions or exchange of commands and data may be repeated, varied, omitted, or supplemented, and other (less important) aspects not shown may be readily implemented. Those skilled in the art will appreciate that the blocks shown in the flow diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. The steps depicted in the flow diagrams and/or represented by other tables, formulas, etc. can themselves include a sequence of operations that need not be described herein. Those of ordinary skill in the art can create source code, microcode, program logic arrays and/or or computer-readable instructions to implement the depicted steps and routines based on the flowcharts and the detailed description provided herein. The routines and portions thereof can be stored in non-volatile memory that forms part of a processor contained in the kiosk 100 or otherwise associated with the kiosk 100 (e.g., a remote processor operably connected to the kiosk 100 via a wired/wireless communication link, etc.), or they can be stored in removable media, such as disks, or hardwired or preprogrammed in chips, such as EEPROM semiconductor chips.

Figure 3:
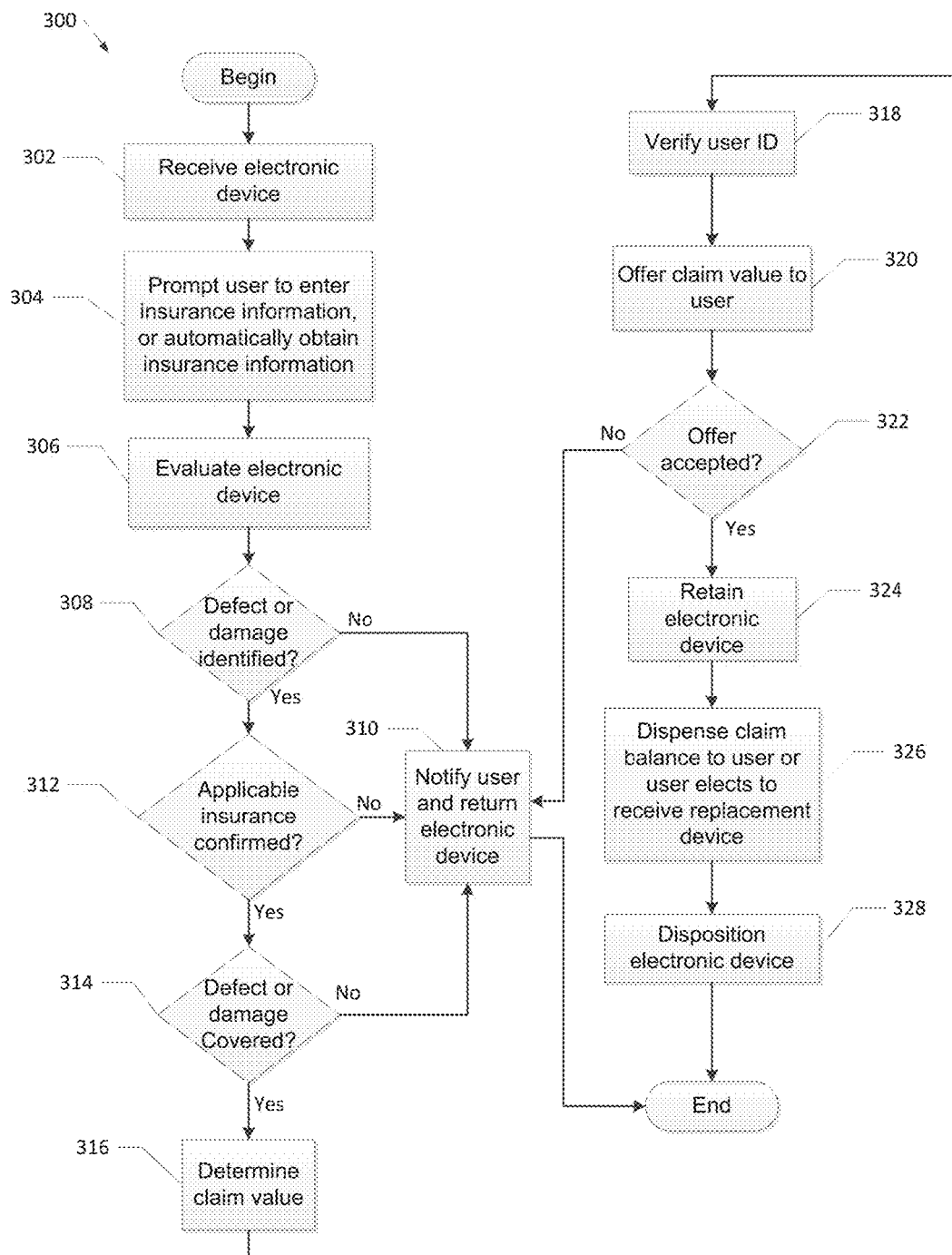
FIG. 3 is a flow diagram illustrating a method of processing an insurance claim for an electronic device in accordance with an embodiment of the present technology.

FIG. 3 is a flow diagram of a routine 300 that can be performed by the kiosk 100 for processing an insurance claim for an electronic device (e.g., mobile phones, tablets, and/or other electronic devices) in accordance with an embodiment of the present technology. The routine can be executed by a processing device (e.g., the processor contained in or otherwise associated with the kiosk 100) in accordance with computer-executable instructions stored on memory. In block 302, the routine receives the electronic device in the kiosk from the user (e.g., in the inspection area 108 of the kiosk 100 (FIG. 1)). The electronic device can be connected to an electrical connector (e.g., an appropriate one of the electrical connectors 242 associated with the kiosk 100 (FIGS. 2A-2D). In block 304, the routine prompts the user to enter insurance information (via, e.g., a textual message on the display screen 104, an audio speaker, etc.). For example, the user may enter her insurance carrier, a plan ID number, or other information that can be used to determine whether applicable insurance is in place. In another embodiment, the kiosk can determine if and what insurance policy exists based on evaluation of the electronic device.

In block 306, the routine performs an evaluation, e.g., a visual and/or electrical inspection of the device, to determine various information about the device. Such information can include, for example, the serial number, the make, model, sub-model of the device, the device features (e.g., memory size, cell service carrier, etc.), device operability, device charge and/or rechargeability, physical condition, display function and condition, etc. In decision block 308, the routine determines whether the electronic device is damaged, dead, defective, etc. If no defect that would warrant an insurance claim is identified, then in block 310 the user is notified (e.g., via the display screen 104, an audio speaker, etc.) that no defect warranting an insurance claim is identified, and the electronic device can be returned to the user. If a defect is identified, then routine 300 continues to decision block 312 to determine whether an applicable insurance plan exists. The insurance plan can be, for example, an insurance policy. For example, the kiosk may communicate the user's plan ID number or other such information via the network to one or more insurance carriers 625 (FIG. 6) to confirm this information. In some embodiments, the kiosk may query a remote database containing a listing of insurance plan ID numbers or other such identifying information, as well as coverage associated with those policies. For example, a remote database maintained by the insurance carrier(s) 625 may contain information indicating that a particular insurance plan ID number corresponds to a 2-year insurance plan for a mobile phone having a particular serial number. Additional information regarding the identified coverage can also be obtained, for example any limitations on coverage (e.g., limited in duration, excluding certain kinds of defects, etc.), any applicable deductible, etc.

In some embodiments, the name of the individual holding the insurance plan associated with the insurance plan ID number is obtained from the insurance carrier(s) 625. The kiosk can obtain this information by querying the database via the network, and can compare the obtained information with the information obtained during visual and/or electrical inspection of the device. For example, the kiosk 100 may confirm that the make, model, serial number, or other identifying features of the device match identifying information associated with the insurance plan ID number. In some embodiments, the name of the plan holder can be compared with the name of the user as determined by user-identification steps (e.g., requiring user to insert identification card such as a driver's license, submit to biometric identification such as a thumbprint scanner, etc.). In some embodiments, the insurance information obtained from the insurance carrier(s) 625 can be stored locally on the kiosk, and can be periodically updated with current plan coverage information.

If no applicable insurance policy can be confirmed, then in block 310 the user is notified and the electronic device is returned to the user. For example, if a user's insurance plan ID entered previously does not correspond to any insurance plan ID provided by the insurance carrier(s) 625, then the routine notifies the user (e.g., via display screen 104) and returns the electronic device.

If applicable insurance coverage is confirmed, then routine 300 continues to decision block 314 to determine whether the identified defect or damage is covered by the applicable insurance. For example, if the user's insurance plan ID entered previously corresponds to an insurance plan ID provided by the insurance carrier(s) 625, then the routine proceeds to determine whether the plan is applicable to the particular electronic device. The routine may confirm that the make, model, serial number, or other identifying features of the electronic device correspond to those associated with the insurance plan ID. This prevents one common fraud in which a user may obtain an insurance policy on one device and then submit an insurance claim on a different device. Once the identity of the device has been confirmed to correspond to that covered by the insurance plan, the routine determines whether the defect or damage is covered. For example, the coverage associated with the insurance plan may be limited in duration (e.g., within 18 months of purchase), or based on certain kinds of defects or damage (e.g., excluding cracked screens from coverage, excluding damage caused by water exposure, etc.). These coverage features can be obtained from the insurance carrier(s) 625 when matching the insurance plan ID provided by the user with that provided by the insurance carrier(s). If the identified defect or damage is not covered by the applicable insurance, then in block 310 the user is notified and the electronic device is returned to the user.

If the identified defect is determined to be covered by the applicable insurance, then in block 316 a claim value is determined. As noted above, deductible information for the particular insurance plan ID can be obtained from the insurance carrier(s) 625 via the network. In some embodiments, the deductible amount can be fixed for a given device so long as the defect is determined to be covered by the applicable insurance. In some embodiments, the deductible amount can vary depending on the particular type of defect, severity of defect, duration of ownership, etc.

Routine 300 continues in block 318 with verifying the identification of user. For example, in some embodiments the user may be prompted to insert identification such as a driver's license into ID reader 112 of the kiosk 100. The identification associated with the driver's license or other identification provided by the user can be compared to the insurance information retrieved from the remote databases (e.g., remote databases maintained by maintained by the insurance carrier(s) 625) to confirm that the user is the holder of the insurance policy. In block 320 the claim value is offered to the user. For example, the offer amount can be displayed to the user via the display screen 104. The user can be prompted to confirm that they wish to submit the device to the insurer and receive payment under the plan. In some embodiments, for example in embodiments in which the user is requesting a replacement mobile device, the user can be prompted to submit payment at this stage for the deductible amount. Such payment can be in the form of cash or coins fed into the kiosk, credit cards, debit cards, gift cards, Bitcoin, and/or other form of value accepted via, e.g., the payment acceptance devices of the kiosk 100 such as cash accepter 113 and/or card reader 115 (FIG. 1).

In decision block 322, the user accepts or declines the offer. If the user declines, then in block 310 the user is notified and the electronic device is returned. If the user accepts the offer, the routine 300 continues in block 324 by retaining the electronic device (e.g., in the collection bin 234 of the kiosk 100). In block 326 the claim balance is dispensed to the user if the user elected to receive payment. Such claim balance can be in the form of, e.g., cash, a voucher redeemable for cash, merchandise, services, etc., electronic value (e.g., bitcoin, e-certificates, credit to electronic payment account, etc.), credit (e.g., a prepaid credit card, debit card, gift card, etc.), coupons, loyalty points, and/or other forms of value paid by the kiosk 100. Alternatively, if the user elects to receive a replacement device, then a request can be automatically transmitted from the kiosk 100 to the particular insurance carrier 625 for fulfilment. In some embodiments, the request for a replacement device can be transmitted to a third party responsible for providing replacement devices to users whose devices are covered. The request can include various levels of information, for example the user's name, submitted device (e.g., serial number, IMEI, MEID, make, model, etc.), the identified defect or other conditions of the device, the paid deductible if any, etc. In some embodiments, a user selecting to receive a replacement device can have the opportunity to input her mailing address for the replacement device (e.g., via touch screen associated with display screen 104, keyboard, joystick, etc.). In some embodiments, the mailing address associated with the insurance plan ID can be displayed to the user (e.g., via display screen 104), and the user can confirm that the displayed address is correct, or may indicate the need to input a different address. In some embodiments, the mailing address can be compared with that displayed on the user's identification (e.g., passport, driver's license, etc.). In some embodiments, the user requesting a replacement device can also be offered an insurance policy for the replacement device. If a user accepts the offer, payment for the newly purchased insurance policy can be submitted via the kiosk. Such payment can be in the form of cash or coins fed into the kiosk, credit cards, debit cards, gift cards, Bitcoin, and/or other form of value. Confirmation of the user's purchase of the new insurance policy can be provided to the user via an electronic notification (e.g., email, SMS, MMS, etc.) or a receipt can be printed and dispensed from the kiosk to the user.

In block 328 the electronic device is dispositioned. For example, the device can be retrieved from the kiosk and sent to the insurer for processing. In some embodiments, the electronic device can be sent instead to a recycler, a manufacturer, or other party. In some embodiments the electronic device can be retained and compensation can be transmitted to the insurer. For example, the retained electronic device can be resold or recycled without being first delivered to the insurer. In some embodiments, an electronic message may be transmitted to the insurer, a recycler, manufacturer, or other party indicating that the mobile device is ready to be retrieved.

The routine 300 allows for self-service processing of insurance claims on electronic devices with the use of an automated kiosk. This allows the particular device to be identified and the applicable insurance plan can be confirmed, thereby preventing a user from fraudulently or inadvertently submitting an insurance claim for a non-covered device. Additionally, since the routine 300 includes accepting the electronic device from the user before issuing payment, there is no risk to the insurance carrier of the user failing to return the device. The automatic inspection and assessment of the electronic device also reduces the risk of inaccurate grading provided by a user.

In some embodiments, one or more of the steps of the routine 300 can be performed remotely, for example via an app installed on the electronic device. In some embodiments, the user can download and install an app on the electronic device. In other embodiments, the app can be installed by a device manufacturer or carrier. With the user's permission, the app can identify the device and perform electrical evaluation. The device can query (e.g., via a wireless connection) remote databases to obtain insurance information as described above, and determine whether any identified defect or damage is covered by an applicable insurance policy. If a detected defect or damage is determined to be covered, a claim value can be determined and presented as an offer to the user via the app on the display of the user's electronic device. In some embodiments, the app can also locate and direct the user to a kiosk. The user can elect to accept the offer, after which the user can bring the electronic device to a kiosk for completion of the insurance claim process. For example, a user can place the electronic device in the kiosk, and via an appropriate electrical connector (e.g., USB connector) the kiosk can obtain the information obtained during evaluation with the app. As described above with respect to FIG. 3, the kiosk can confirm that the electronic device submitted is the same as that evaluated by the mobile app. In some embodiments, the kiosk can perform an additional evaluation (electrical and/or visual) to confirm that the condition of the electronic device is consistent with the data obtained via the app. In some embodiments, the identity of the user can be verified and the routine can continue as described above with respect to blocks 324, 326, and 328 of FIG. 3, including retaining the electronic device, dispensing the claim balance to the user (or receiving a selection from the user to request a replacement device), and sending the electronic device to the insurer, manufacturer, recycler, or other party.

In some embodiments, a user may wish to make a claim for a device that has been lost or stolen. In some embodiments, the routine described above with respect to FIG. 3 can be modified to accommodate scenarios in which no electronic device can be submitted for evaluation. For example, the user may be prompted to enter insurance information at the kiosk, (e.g., via touch screen associated with display screen 104, keyboard, joystick, etc.) and may also indicate that the electronic device has been lost, stolen, or is otherwise unavailable for inspection and evaluation. The routine can query remote databases to confirm that an applicable insurance policy exists and that it covers the scenario presented (loss, theft, etc.). If the loss is confirmed to be covered, the routine can proceed as described above with respect to FIG. 3, for example a claim value can be determined, the user identification can be verified, and the claim value can be offered to the user. If the user accepts the claim value, the amount can be dispensed to the user and claim information can be automatically transmitted to the insurer (for example insurance carrier(s) 625). In this scenario, there is no electronic device to retain or to send to the insurer, and so these steps in the routine are omitted.

Figure 4:
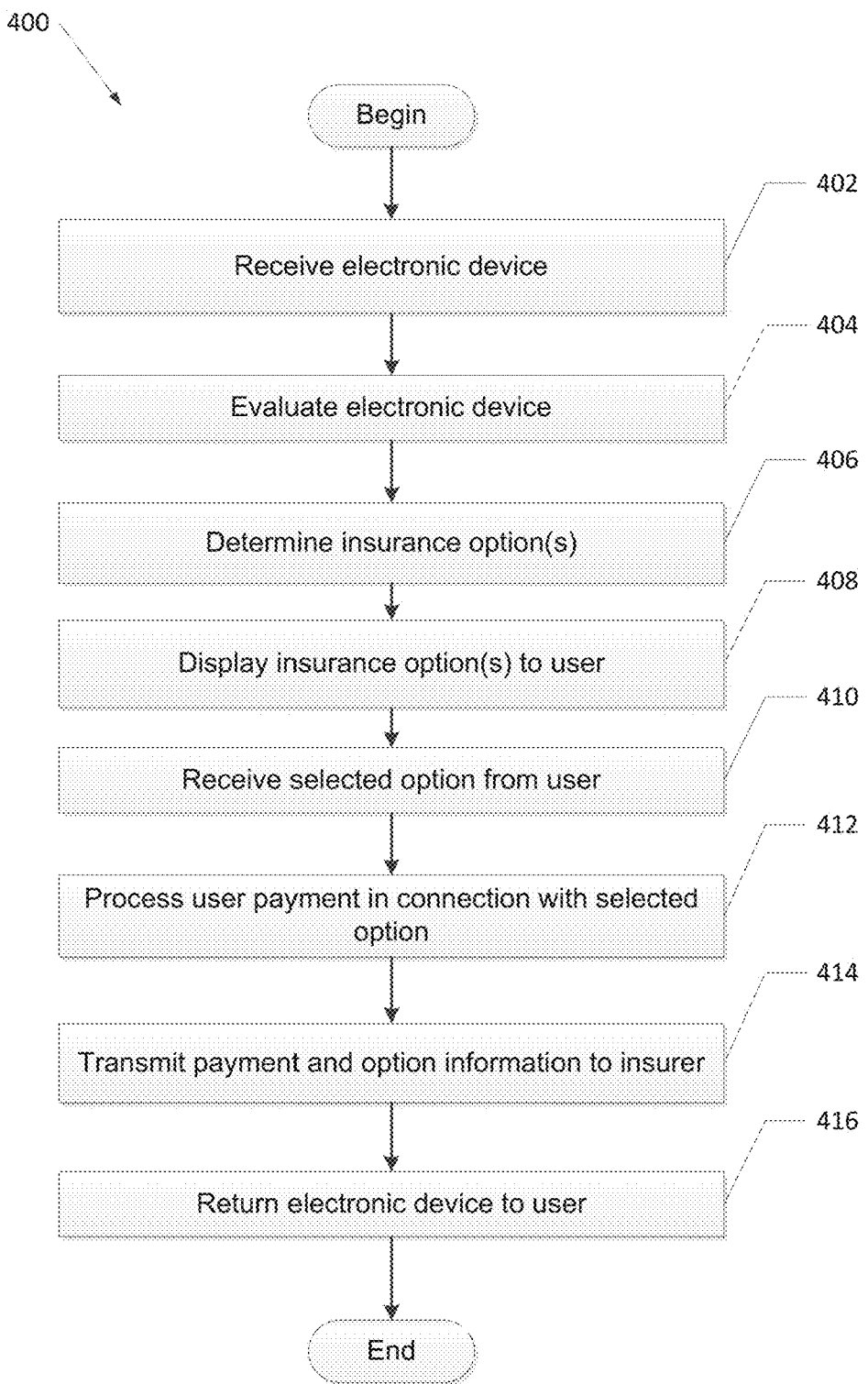
FIG. 4 is a flow diagram illustrating a method of offering electronic device insurance in accordance with an embodiment of the present technology.

FIG. 4 is a flow diagram of a routine 400 that can be performed by the kiosk 100 for providing insurance for an electronic device (e.g., a mobile phone and/or other electronic device) to a user in accordance with an embodiment of the present technology. In some embodiments, the routine can be executed by a processing device associated with the kiosk 100 in accordance with computer-executable instructions stored on memory. In block 402, the routine begins by receiving the device. In some embodiments, the device can be a mobile phone received by the kiosk 100 as described in detail above. In other embodiments, the device can be other consumer electronic devices, such as a laptop computer, notebook, tablet, MP3 player, PDA, smartwatch (e.g., Apple Watch), etc. In block 404, the routine evaluates the electronic device. As described above, in some embodiments this can include visual and/or electrical inspection and analysis. This can include, for example, utilizing one more one or more cameras, mirrors, etc., mounted to or otherwise associated with the upper and lower chambers 230 and 232 (FIG. 2A) to determine, for example, the length, width, and thickness dimensions of the device (e.g., "primary" visual/ physical features). By way of example, in some embodiments this can include obtaining images of the device from multiple angles (e.g., top, end, side) and measuring the images to determine the external dimensions of the device. In some embodiments, these primary features can be compared (via, e.g., a template matching process) to corresponding features (e.g., length, width, thickness, etc.) of known devices stored in, e.g., a database to determine a candidate group of devices to which the subject device may belong. This information can then be used to inform further "secondary" visual inspections and/or imaging of the device to determine other visual characteristics or features, such as the existence and type of a logo (e.g., a model or brand logo), a SIM card location (as evidenced by, e.g. a hole for insertion of a SIM card eject tool), antenna location, connector ports, button locations and sizes, etc. Additionally, the device can be visually inspected/imaged to ascertain the condition and/or function of the device, such as display screen condition (e.g. cracks in the screen glass), case condition, LCD function, etc. As described above with reference to, for example, FIG. 2C, electrical evaluation can include operably connecting a suitable electrical connector (e.g., a USB connector) to the mobile phone, and executing computer-readable instructions by the kiosk processing device to query or otherwise interrogate the mobile phone for information about device identity, features, etc. For example, in some embodiments the electrical evaluation can include determining the device PID/VID, carrier, International Mobile Station Equipment Identity (IMEI), Mobile Equipment Identifier (MEID), absence or presence of a SIM card, memory size, and/or other hardware, software, or electronic features and/or capabilities of the device.

In block 406, one or more insurance options are determined. In some embodiments, information gathered either by user input or by the electrical and/or visual evaluation is used to determine one or more insurance options. For example, based on the identified device and its evaluated condition, one or more insurance options can be determined. The insurance option(s) can vary in amount of coverage, type of defects covered, duration, premium amount, deductible, and other features. In one example, the routine can determine two different insurance options to cover the device for a term of one year, the first option may include a higher premium but a lower deductible due in the event of damage, while the second option may include a lower premium but a higher deductible. In some embodiments, the insurance option(s) can be selected from among a pre-existing set of possible insurance option(s), and based on the various features of the electronic device (e.g., duration of ownership, condition of phone, etc.), one or more insurance option(s) can be selected for presentation to the user. In some embodiments, the collected information about the electronic device and the user can be transmitted via the network to the insurance carrier(s) 625 (FIG. 6), which can respond with one or more insurance options to present to the user. In block 408 the insurance option(s) are presented to the user (e.g., via display screen 104, an audio speaker, etc.), and in block 410 the user's selection of insurance option is received (e.g., via touch screen associated with display screen 104, keyboard, joystick, etc.).

After receiving the user selection, the routine continues in block 412 with processing user payment in connection with the selection. Such payment can be in the form of cash or coins fed into the kiosk, credit cards, debit cards, gift cards, Bitcoin, and/or other form of value. Routine 400 continues in block 414 with transmitting payment and selection information to the insurer. In some embodiments, the collected information including payment, user identification, device ID, and user selection of an insurance option can be transmitted via the network to the insurance carrier(s) 625 (FIG. 6), which can confirm and finalize processing of the purchase. In block 416 the electronic device is returned to the user. The user can additionally receive confirmation of the purchased insurance plan payment in connection with user's selection. In some embodiments a confirmation page, receipt, or other physical indication of the purchased plan can be printed by the kiosk and dispensed to the user. In some embodiments, electronic notification can be sent to the user, for example via a text message to the user's mobile device, e-mail, etc.

The routine 400 provides a convenient and accessible way for a user to purchase insurance coverage for an electronic device. The automated inspection allows for the condition of the phone to be rapidly determined without the need for trained staff and without requiring the user to surrender the phone for any significant amount of time for inspection by an insurer. Selling insurance coverage for electronic devices with the automated kiosk results in more efficient processing, and also allows for confirmation of the current condition of the electronic device prior to issuing coverage. As a result, users can obtain insurance coverage for electronic devices even well beyond the initial date of purchase, while risk to the insurer is reduced by the automated evaluation of the electronic device. In some embodiments, a user can upgrade or modify existing insurance coverage via the kiosk 100. In some embodiments, a user can be presented with an offer to purchase a new phone as an alternative or in addition to purchasing insurance for their current device.

The flow diagrams described herein (e.g., those described with reference to FIGS. 3 and 4) are representative flow diagrams that depict routines and processes used in some embodiments. These processes and routines can be executed by a processing device, such as a processor or CPU associated with the kiosk 100 (as described below with reference to, e.g., FIG. 5), an associated server computer, wireless device, personal computer, etc. in accordance with computer-executable instructions stored on a computer-readable medium. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. These flow diagrams may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. For example, while processes or blocks are presented in a given order, alternative implementations may perform routines having steps, or employ systems having blocks in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Various steps depicted in the flow diagrams can be of a type well known in the art and can itself include a sequence of operations that need not be described herein. Those of ordinary skill in the art can create source code, microcode, program logic arrays or otherwise implement the inventions described herein based on the Figures and the detailed description provided herein. The routines described above can be stored in non-volatile memory, or in removable media, such as disks, or hardwired or preprogrammed in chips, such as EEPROM semiconductor chips.

Figure 5:
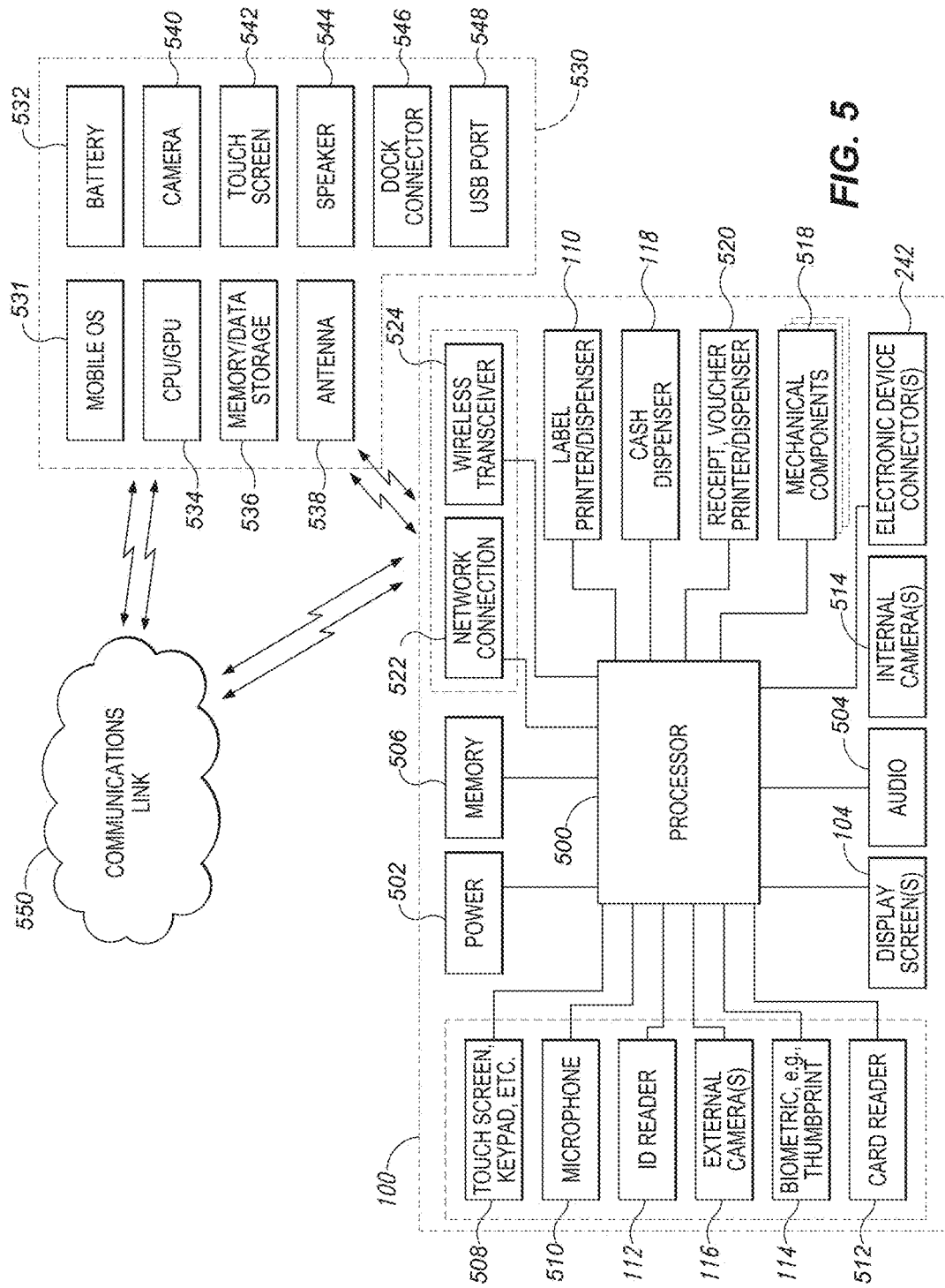
FIG. 5 is a schematic diagram illustrating various components associated with the machine of FIG. 1.

FIG. 5 provides a schematic representation of an architecture of the kiosk 100 in accordance with an embodiment of the present technology. In the illustrated embodiment, the kiosk 100 includes a suitable processor or central processing unit ("CPU") 500 that controls operation of the kiosk 100 in accordance with computer-readable instructions stored on system memory 506. The CPU 500, for example, can control performance of the various routines associated with processing and offering insurance claims for electronic devices as described herein with reference to, for example, FIGS. 3 and 4. The CPU 500 may be any logic processing unit, such as one or more CPUs, digital signal processors (DSPs), application-specific integrated circuits (ASICs), etc. The CPU 500 may be a single processing unit or multiple processing units in a device or distributed across multiple devices. The CPU 500 is connected to the memory 506 and may be coupled to other hardware devices, for example, with the use of a bus (e.g., a PCI Express or Serial ATA bus). The CPU 500 can include, by way of example, a standard personal computer ("PC") (e.g., a DELL OPTIPLEX 780 or 7010 PC) or other type of embedded computer running any suitable operating system, such as Linux, Windows, Android, iOS, MAC OS, or an embedded real-time operating system. In some embodiments, the CPU 500 can be a small form factor PC with integrated hard disk drive ("HDD") or solid-state drive ("SSD") and universal serial bus ("USB") or other ports to communicate with the other components of the kiosk 100. In other embodiments, the CPU 500 can include a microprocessor with a standalone motherboard that interfaces with a separate HDD. The memory 506 can include read-only memory (ROM) and random access memory (RAM) or other storage devices, such as disk drives or SSDs, that store the executable applications, test software, databases and other software required to, for example, implement the various routines described herein (e.g., those described with reference to FIGS. 3 and 4), control kiosk components, process electronic device information and data (to, e.g., evaluate device make, model, condition, pricing, etc.), communicate and exchange data and information with remote computers and other devices, etc.

The CPU 500 can provide information and instructions to kiosk users via the display screen 104 and/or an audio system (e.g., a speaker) 504. The CPU 500 can also receive user inputs via, e.g., a touch screen 508 associated with the display screen 104, a keypad with physical keys, and/or a microphone 510. Additionally, the CPU 500 can receive personal identification and/or biometric information associated with users via the ID reader 112, one or more of the external cameras 116, and/or the fingerprint reader 114. In some embodiments, the CPU 500 can also receive information (such as user identification and/or account information) via a card reader 512 (e.g., a debit, credit, or loyalty card reader having, e.g., a suitable magnetic stripe reader, optical reader, etc.). The CPU 500 can also control operation of the label dispenser 110 and systems for providing remuneration to users, such as the cash dispenser 118 and/or a receipt or voucher printer and an associated dispenser 520.

As noted above, the kiosk 100 additionally includes a number of electronic, optical and electromechanical devices for electrically, visually and/or physically analyzing electronic devices placed therein for recycling. Such systems can include one more internal cameras 514 for visually inspecting electronic devices to, e.g., determine the external dimensions and condition, and one or more of the electrical connectors 242 (e.g., USB connectors) for, e.g., powering up electronic devices and performing electronic analyses. As noted above, the cameras 514 can be operably coupled to the upper and lower chambers 230 and 232, and the connectors 242 can be movably and interchangeably carried by the carrousel 240 (FIGS. 2A-2D). The kiosk 100 further includes a plurality of mechanical components that are electronically actuated for carrying out the various functions of the kiosk 100 during operation. The mechanical components 518 can include, for example, the inspection area access door 106 and one or more of the movable components (e.g. the inspection plate 244, the upper and lower chambers 230 and 232, etc.) operably disposed within the inspection area 108 (FIG. 1). The kiosk 100 further includes power 502, which can include battery power and/or facility power for operation of the various electrical components associated with kiosk operation.

In the illustrated embodiment, the kiosk 100 further includes a network connection 522 (e.g., a wired connection, such as an Ethernet port, cable modem, FireWire cable, Lightning connector, USB port, etc.) suitable for communication with, e.g., all manner of processing devices (including remote processing devices) via a communication link 550, and a wireless transceiver 524 (e.g., including a Wi-Fi access point; Bluetooth transceiver; near-field communication (NFC) device; wireless modem or cellular radio utilizing GSM, CDMA, 3G and/or 4G technologies; etc.) suitable for communication with, e.g., all manner of processing devices (including remote processing devices) via the communication link 550 and/or directly via, e.g., a wireless peer-to-peer connection. For example, the wireless transceiver 524 can facilitate wireless communication with electronic devices, such as a mobile device 530 (e.g., a smartphone) either in the proximity of the kiosk 100 or remote therefrom. In the illustrated embodiment, the electronic device 530 is depicted as a mobile device, e.g., a mobile phone. In other embodiments, however, the electronic device 530 can be other types of electronic devices including, for example, other handheld devices; PDAs; MP3 players; tablet, notebook, laptop and desktop computers; e-readers; cameras; TVs; DVRs; game consoles; Google Glass™; smart-watches; other wearable computers, etc. By way of example only, in the illustrated embodiment the mobile device 530 can include one or more features, applications and/or other elements commonly found in smartphones and other known mobile devices. For example, the mobile device 530 can include a CPU and/or a graphics processing unit ("GPU") 534 for executing computer readable instructions stored on memory 536. In addition, the mobile device 530 can include an internal power source or battery 532, a dock connector 546, a USB port 548, a camera 540, and/or well-known input devices, including, for example, a touch screen 542, a keypad, etc. In many embodiments, the mobile device 530 can also include a speaker 544 for two-way communication and audio playback. In addition to the foregoing features, the mobile device 530 can include a mobile operating system (OS) 531 and/or a device wireless transceiver that may include one or more antennas 538 for wirelessly communicating with, for example, other mobile devices, websites, and the kiosk 100. Such communication can be performed via, e.g., the communication link 550 (which can include the Internet, public and private intranet, a local or extended Wi-Fi network, cell towers, the plain old telephone system (POTS), etc.), direct wireless communication, etc.

Unless described otherwise, the construction and operation of the various components shown in FIG. 5 are of conventional design. As a result, such components need not be described in further detail herein, as they will be readily understood by those skilled in the relevant art. In other embodiments, the kiosk 100 and/or the mobile device 530 can include other features that may be different from those described above. In still further embodiments, the kiosk 100 and/or the mobile device 530 can include more or fewer features similar to those described above.

Figure 6:
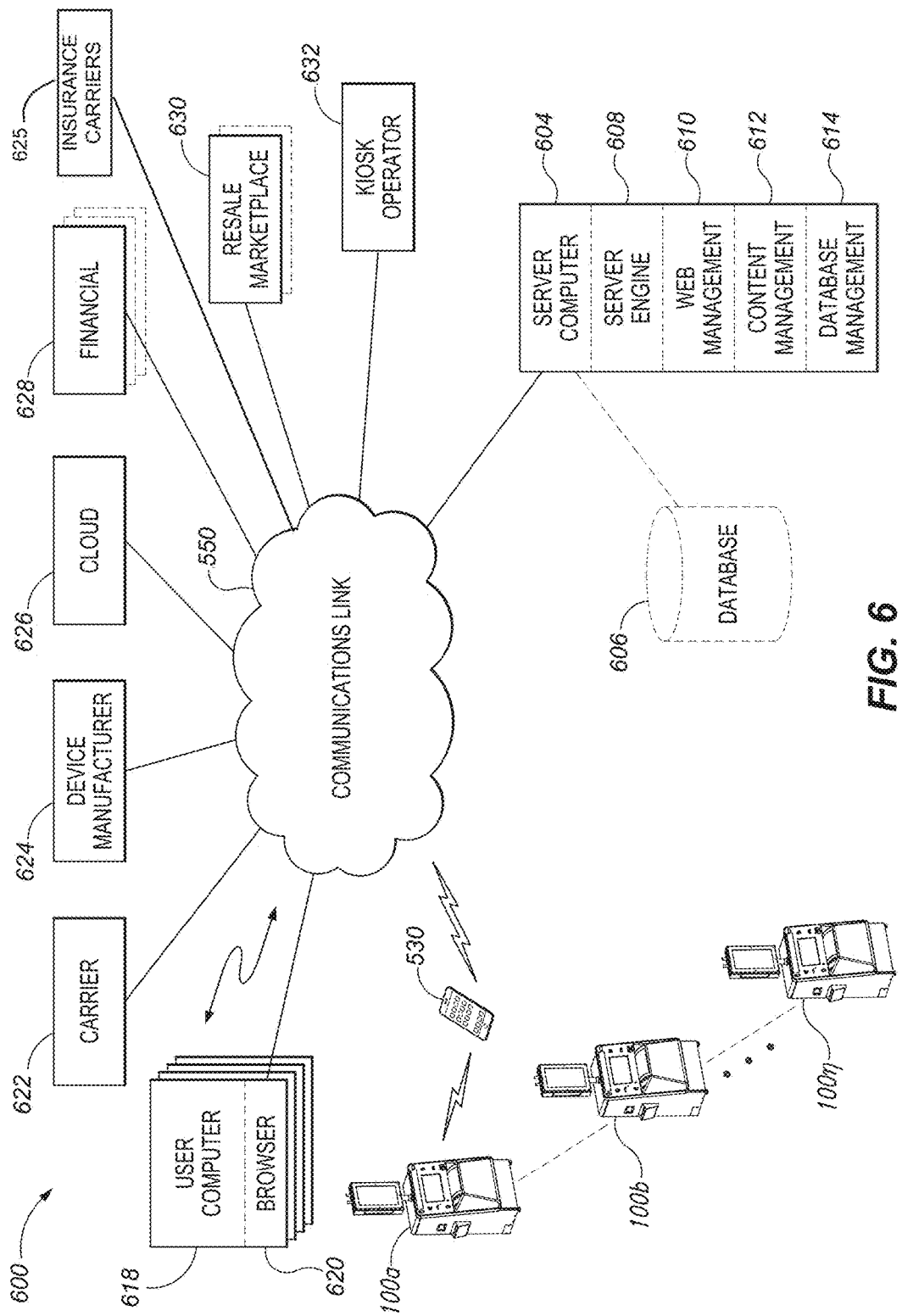
FIG. 6 is a schematic diagram of a suitable distributed computing environment for implementing various aspects of the present technology.

FIG. 6 is a schematic diagram of a suitable network environment for implementing various aspects of an electronic device recycling system 600 configured in accordance with embodiments of the present technology. In the illustrated embodiment, a plurality of the kiosks 100 (identified individually as kiosks 100a-100n) can exchange information with one or more remote computers (e.g., one or more server computers 604) via the communication link 550. Although the communication link 550 can include a publically available network (e.g., the Internet with a web interface), a private communication link, such as an intranet or other network may also be used. Moreover, in various embodiments the individual kiosk 100 can be connected to a host computer (not shown) that facilitates the exchange of information between the kiosks 100 and remote computers, other kiosks, mobile devices, etc.

The server computer 604 can perform many or all of the functions for receiving, routing and storing electronic messages, such as webpages, audio signals and electronic images necessary to implement the various electronic transactions described herein. For example, the server computer 604 can retrieve and exchange web pages and other content with an associated database or databases 606. In some embodiments, the database 606 can include information related to mobile phones and/or other consumer electronic devices. Such information can include, for example, make, model, serial number, IMEI, MEID, carrier plan information, pricing information, owner information, etc., as well as dimensional information (size, shape, location of displays, ports, etc.) and other visual information (e.g., logo shapes, sizes, locations, etc.) associated with known devices, such as particular device models, sub-models, etc. In various embodiments the server computer 604 can also include a server engine 608, a web page management component 610, a content management component 612, and a database management component 614. The server engine 608 can perform the basic processing and operating system level tasks associated with the various technologies described herein. The webpage management component 610 can handle creation and/or display and/or routing of web or other display pages. The content management component 612 can handle many of the functions associated with the routines described herein. The database management component 614 can perform various storage, retrieval and query tasks associated with the database 606, and can store various information and data such as animation, graphics, visual and audio signals, etc. Those of ordinary skill in the art will appreciate that many of the routines and/or portions thereof and other functions and methods described above can be performed by the kiosk 100 (e.g., the processor 500), the server computer 604, or both.

In the illustrated embodiment, the kiosks 100 can also be operably connected to a plurality of other remote devices and systems via the communication link 550. For example, the kiosks 100 can be operably connected to a plurality of user devices 618 (e.g., personal computers, laptops, handheld devices, etc.) having associated browsers 620. Similarly, as described above the kiosks 100 can each include wireless communication facilities for exchanging digital information with mobile devices, such as the mobile device 530. The kiosks 100 and/or the server computer 604 are also operably connectable to a series of remote computers for obtaining data and/or exchanging information with necessary service providers, financial institutions, device manufactures, authorities, government agencies, etc. For example, the kiosks 100 and the server computer 604 can be operably connected to one or more cell carriers 622, one or more device manufacturers 624 (e.g., mobile phone manufacturers), one or more electronic payment or financial institutions 628, one or more insurance carriers 625, one or more databases (e.g., the GSMA International Mobile Equipment Identity Database, etc.), and one or more computers and/or other remotely located or shared resources associated with cloud computing 626. The financial institutions 628 can include all manner of entity associated with conducting financial transactions, including banks, credit/debit card facilities, online commerce facilities, online payment systems, virtual cash systems, money transfer systems, etc.

In addition to the foregoing, the kiosks 100 and the server computer 604 can also be operably connected to a resale marketplace 630 and a kiosk operator 632. The resale marketplace 630 represents a system of remote computers and/or services providers associated with the reselling of consumer electronic devices through both electronic and brick-and-mortar channels. Such entities and facilities can be associated with, for example, online auctions for reselling used electronic devices as well as for establishing market prices for such devices. The kiosk operator 632 can be a central computer or system of computers for controlling all manner of operation of the network of kiosks 100. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 632 can further include one or more display screens operably connected to cameras located at each of the kiosks 100 (e.g., one or more of the cameras 116 described above with reference to FIG. 1). This remote viewing capability enables operator personnel to verify user identification and/or make other visual observations at the kiosks 100 in real-time during transactions, as described above with reference to FIG. 1.

The foregoing description of the electronic device recycling system 600 illustrates but one possible network system suitable for implementing the various technologies described herein. Accordingly, those of ordinary skill in the art will appreciate that other systems consistent with the present technology can omit one or more of the facilities described in reference to FIG. 6 or may include one or more additional facilities not described in detail in FIG. 6.

Those of ordinary skill in the art will appreciate that the routines and other functions and methods described above can be performed by various processing devices, such as the kiosk processor 500 (FIG. 5), the server computer 604 (FIG. 6), or both. The processes can be implemented as an application specific integrated circuit (ASIC), by a digital signal processing (DSP) integrated circuit, through conventional programmed logic arrays or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

The kiosks 100, mobile devices 330, server computers 604, user computers and/or other user devices 618, etc. may include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computer devices may include other program modules such as an operating system, one or more application programs (e.g., word processing or spread sheet applications), and the like. The user computers may include wireless computers, such as mobile phones, personal digital assistants (PDAs), palm-top computers, etc., which communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown, a private network, such as an intranet may likewise be used herein. The network may have a client-server architecture, in which a computer is dedicated to serving other client computers, or it may have other architectures such as peer-to-peer, in which one or more computers serve simultaneously as servers and clients. A database or databases, coupled to the server computer(s), stores much of the web pages and content exchanged between the user computers. The server computer(s), including the database(s), may employ security measures to inhibit malicious attacks on the system and preserve the integrity of the messages and data stored therein (e.g., firewall systems, message encryption and/or authentication (e.g., using transport layer security (TLS) or secure socket layers (SSL)), password protection schemes, encryption of stored data (e.g., using trusted computing hardware), and the like).

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein, and refer to any of the above devices and systems, as well as any data processor. Input devices may include a touchpad, keyboard and/or a pointing device such as a mouse. Other input devices are possible such as a microphone, joystick, pen, game pad, scanner, digital camera, video camera, and the like. The data storage devices may include any type of computer-readable media that can store data accessible by a computer, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices may include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a propagating signal per se.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like, are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples—alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method, performed by an automated kiosk having a computing system with a processor, of compensating a user for an electronic device, the method comprising:
   receiving the electronic device at the kiosk;
   analyzing the electronic device, wherein analyzing the electronic device comprises electrically analyzing the electronic device via a wired electrical connector and/or a wireless transceiver associated with the kiosk, and wherein at least a portion of the analysis is performed by the computing system;
   based at least in part on the analysis of the electronic device, evaluating the electronic device;
   automatically determining, with the computing system, whether the electronic device is covered by an insurance plan; and
   when the device is covered by an insurance plan, determining compensation due to the user based at least in part on the evaluation of the electronic device and the insurance plan.

2. The method of claim 1 wherein automatically determining whether the electronic device is covered by an insurance plan comprises:
   obtaining a unique identifier associated with the electronic device;
   querying a remote database for insurance information relating to the unique identifier; and
   receiving information from the remote database regarding an insurance plan associated with the electronic device.

3. The method of claim 2 wherein the unique identifier comprises a serial number of the electronic device.

4. The method of claim 1 wherein automatically determining whether the electronic device is covered by an insurance plan comprises:
   obtaining a unique identifier associated with the insurance plan;
   querying a remote database for information relating to the insurance plan; and
   based on the information, determining whether the electronic device is covered by the insurance plan.

5. The method of claim 1, further comprising determining a deductible due from the user, and receiving the deductible from the user via the kiosk.

6. The method of claim 1 wherein evaluating the electronic device comprises detecting a defect in the electronic device.

7. The method of claim 6, further comprising:
   querying a remote database for insurance information relating to the electronic device;
   receiving information from the remote database regarding an insurance plan associated with the electronic device; and
   based on the information received from the remote database, determining whether the detected defect is covered by the insurance plan.

8. The method of claim 7, further comprising:
   when the defect is not covered by the insurance plan, displaying a message to the user that identifies the defect and indicates that the identified defect is not covered by the insurance plan.

9. A method, performed by an automated kiosk having a computing system with a processor, of offering an insurance plan for an electronic device, the method comprising:
   receiving an electronic device from a user at the kiosk;
   identifying the electronic device;
   evaluating a condition of the electronic device via at least one of an imaging component, a wired electrical connector, and/or a wireless transceiver operably associated with the kiosk;
   displaying at least one insurance option to the user via a user interface;
   receiving, from the user interface, a selection of the at least one insurance option; and
   receiving payment for the selected insurance option via the kiosk.

10. The method of claim 9, further comprising:
    electronically transmitting the evaluated condition of the electronic device to an insurer; and
    receiving, from the insurer, the at least one insurance option to be presented to the user.

11. The method of claim 10 wherein evaluating a condition of the electronic device comprises electrically analyzing the electronic device via the wired electrical connector and/or the wireless transceiver, and visually analyzing the electronic device via the imaging component.

12. The method of claim 11 wherein the at least one insurance option is based at least in part on the electrical and visual analysis of the electronic device.

13. The method of claim 10 wherein identifying the electronic device comprises electrically identifying the electronic device.

14. The method of claim 9 further comprising automatically electronically communicating the selected option to an insurer.

15. The method of claim 9 wherein the at least one insurance option comprises a coverage, a premium amount, and a deductible.

16. A consumer-operated system for processing an insurance claim for an electronic device, the system comprising:
    an inspection area for receiving the electronic device;
    an imaging component operably disposed in relation to the inspection area to visually inspect electronic devices received therein;
    a wired electrical connector and/or a wireless transceiver operably disposed in relation to the inspection area to be connected to electronic devices received therein;
    a processing device operably connected to the imaging component; and
    a computer-readable medium that contains computer-executable instructions configured to cause the processing device to operate the system according to a method that comprises:
        receiving the electronic device in the inspection area;
        analyzing the device via the wired electrical connector and/or the wireless transceiver;
        visually analyzing the electronic device via the imaging component; and
        automatically determining whether the electronic device is covered by an insurance plan.

17. The system of claim 16 wherein automatically determining whether the electronic device is covered by an insurance plan comprises:
    obtaining a unique identifier associated with the electronic device;
    querying a remote database for insurance information relating to the unique identifier; and
    receiving information from the remote database regarding an insurance plan associated with the electronic device.

18. The system of claim 16 wherein the method further comprises, based at least in part on analyzing the device via the wired electrical connector and/or the wireless transceiver and the visual analysis of the electronic device, evaluating the condition of the electronic device.

19. The system of claim 18 wherein the method further comprises, based at least in part on the evaluated condition of the electronic device and the insurance plan, determining compensation due to the user.

20. The system of claim 19, further comprising a payment dispenser, and wherein the method further comprises dispensing the determined compensation to the user.

* * * * *

UNITED STATES PATENT AND TRADEMARK OFFICE
CERTIFICATE OF CORRECTION

PATENT NO. : 10,572,946 B2
APPLICATION NO. : 14/925375
DATED : February 25, 2020
INVENTOR(S) : Mark Vincent Bowles et al.

It is certified that error appears in the above-identified patent and that said Letters Patent is hereby corrected as shown below:

On the Title Page

On the page 4, in Column 2, item (56) under "Other Publications", Line 21, delete ""Tackiing" and insert -- "Tackling --, therefor.

On the page 4, in Column 2, item (56) under "Other Publications", Line 25, delete "ipone" and insert -- iphone --, therefor.

On the page 4, in Column 2, item (56) under "Other Publications", Line 49, delete "PaNnel" and insert -- Panel --, therefor.

Signed and Sealed this
Nineteenth Day of May, 2020

Andrei Iancu
*Director of the United States Patent and Trademark Office*